(12) United States Patent
Sieminski

(10) Patent No.: US 6,823,239 B2
(45) Date of Patent: Nov. 23, 2004

(54) INTERNET-ENABLED CENTRAL IRRIGATION CONTROL

(75) Inventor: James M. Sieminski, Simi Valley, CA (US)

(73) Assignee: Rain Master Irrigation Systems, Inc., Simi Valley, CA (US)

( * ) Notice: Subject to any disclaimer, the term of this patent is extended or adjusted under 35 U.S.C. 154(b) by 0 days.

(21) Appl. No.: 10/288,561

(22) Filed: Nov. 4, 2002

(65) Prior Publication Data

US 2003/0093159 A1 May 15, 2003

Related U.S. Application Data

(60) Provisional application No. 60/338,740, filed on Nov. 5, 2001.

(51) Int. Cl.[7] ............................. G05B 11/01; A01G 25/00
(52) U.S. Cl. ............................. 700/284; 700/19; 239/69
(58) Field of Search ........................... 239/69, 70, 99; 700/284, 9, 19, 14, 16; 137/78.2

(56) References Cited

U.S. PATENT DOCUMENTS

| | | | |
|---|---|---|---|
| 5,479,339 A | * 12/1995 | Miller | 700/16 |
| 5,870,302 A | * 2/1999 | Oliver | 700/11 |
| 6,061,603 A | * 5/2000 | Papadopoulos et al. | 700/83 |
| 6,314,340 B1 | * 11/2001 | Mecham et al. | 700/284 |
| 6,343,255 B1 | * 1/2002 | Peek et al. | 702/3 |
| 6,437,692 B1 | * 8/2002 | Petite et al. | 340/540 |
| 6,600,971 B1 | * 7/2003 | Smith et al. | 700/284 |
| 2003/0149526 A1 | * 8/2003 | Zhou et al. | 701/213 |

* cited by examiner

*Primary Examiner*—Paul Rodriguez
(74) *Attorney, Agent, or Firm*—Christie, Parker & Hale, LLP

(57) ABSTRACT

A method and apparatus for Internet-enabled irrigation control. An irrigation controller is coupled to a wide area network, such as the Internet, via a wireless carrier network. The irrigation controller has a unique identifier which makes the irrigation controller addressable by an irrigation server located on the Internet. The irrigation controller is capable of stand-alone operation and may be programmed by a user communicating with the irrigation controller using the irrigation server and the wireless carrier. The user may also send immediate commands to the irrigation controller such as rain shutdown commands. In addition, the irrigation controller may transmit irrigation status messages back to the irrigation server such irrigation station faults and excessive flow alarms. The irrigation server saves the status messages in a database for later retrieval by the user. In addition, the irrigation server may also transmit status and alarm messages to the user via email or by telephone.

31 Claims, 18 Drawing Sheets

FIG. 12

| HOME | PROGRAMMING | GLOBAL PROGRAMMING | RAIN SHUTDOWN | REPORTS | PAYMENT/SERVICE ACTIVATION | SETUP |

CONTROLLER AND PROGRAMMING SETUP — 1202 — 1203

SELECT ACCOUNT — 1200 / 1201    STEP 2: SELECT CONTROLLER

| ACCOUNT NAME | LOCATION |
|---|---|
| IBM | BOCA RATON, FL ▲ |
| SONY | NEW YORK, NY |
| LOS ANGELES U.S.D | LOS ANGELES, CA |
| HP | PALO ALTO, CA |
| DELL | AUSTIN, TX ▼ |

| NO. | CONTROLLER NAME | LOCATION |
|---|---|---|
| 1 | PORTER RANCH JR. HIGH SCHOOL | CHATSWORTH ▲ |
| 2 | CAFETERIA | GRID 21B |
| 3 | EAST WING | GRID 07C |
| 4 | NORTH PARKING LOT | GRID 43D |
| 5 | SOUTH PARKING LOT | GRID 18E ▼ |

STEP 3: SELECT SETUP FUNCTION — 1204    STEP 2: SELECT CONTROLLER

CONTROLLER ▼
PROGRAMS
TIME/DATE — 1205

| DATE | TIME |
|---|---|
| OCTOBER ▼ 2002 ▼▼ | ▼ ☒ AM |
| NOVEMBER ▲▲ | 5:00 ▲ ■ PM |

| SUN | MON | TUE | WED | THU | FRI | SAT |
|---|---|---|---|---|---|---|
|  |  |  | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 30 | 31 |  |  |

CANCEL
OK

— 1224

PROGRAM SETUP

THIS PROGRAM USES:

☒ MASTER VALVE
■ NO MASTER VALVE

■ PUMP(INDEPENDENT OF MASTER VALVE)
☒ NO PUMP

☒ CYCLE AND SOAK PROGRAMMING — 1208
■ CONVENTIONAL PROGRAMMING — 1210

☒ STACKING OF PROGRAMS — 1212
■ NO STACK(MULTI STATION OPERATION)

■ RAIN SENSOR ENABLE — 1241
☒ RAIN SENSOR DISABLE — 1216

☒ CONVENTIONAL 7 DAY PROGRAMMING
■ SKIP DAY PROGRAMMING — 1218

☒ ET ADJUSTED PROGRAM — 1220
■ CONVENTIONAL PROGRAM

■ ODD/EVEN WATERING ENABLED — 1222
☒ ODD/EVEN WATERING DISABLED

— 1206

CANCEL    OK

FIG. 13

| HOME | PROGRAMMING | GLOBAL PROGRAMMING | RAIN SHUTDOWN | REPORTS | PAYMENT/SERVICE ACTIVATION | SETUP |

CONTROLLER SETUP

FLOW

FLOW SENSOR
☒ ENABLED — 1302
■ DISABLED

PIPE SIZE
| 1 ▼ |
| 1.25 |
| 1.5 |
| 2 | — 1304
| 3 |
| 4 |

MAIN LINE FLOW LIMIT
500 ▲▼ GALLONS — 1306

UNSCHEDULED FLOW LIMIT
200 ▲▼ GALLONS — 1308

FLOW CHECK DELAY
2 ▲▼ MINUTES — 1310

AUTO LEARN FLOW PERCENTAGE
20 ▲▼ % — 1312

| STATION | NAME | UPPER LIMIT GALLONS |
|---------|------|---------------------|
| 1 | | 30 |
| 2 | | 50 |
| 3 | | 55 |
| 4 | | 45 |

— 1314

TYPE OF MASTER VALVE
■ NORMALLY OPEN — 1316
☒ NORMALLY CLOSED

INNER STATION DELAY
0 ▲▼ SECONDS — 1318

SECURITY CODE
0 ▲▼ (0-9999) — 1320

AUDIBLE ALARM
☒ ENABLED — 1322
■ DISABLED

FIG. 15

[HOME] [PROGRAMMING] [GLOBAL PROGRAMMING] [RAIN SHUTDOWN] [REPORTS] [PAYMENT/SERVICE ACTIVATION] [SETUP]

ET PROGRAMMING — 1500

STEP 3: SELECT CONTROLLER PROGRAMMING OPTIONS

| TURF SCHEDULE | ET WATER SAVINGS | 100% |

— 1502

PROGRAM: 1 ■  2 ☒  3 ■  4 ■

| NO. | START TIMES | |
|---|---|---|
| 1 | 5:00 AM | EDIT |
| 2 | 7:00 PM | EDIT |
| 3 | 6:45 AM | EDIT |
| 4 | 5:00 PM | EDIT |
| 5 | 3:45 AM | EDIT |

WATER DAYS

| SUN | MON | TUES | WED | THUR | FRI | SAT |
|---|---|---|---|---|---|---|
|  |  |  |  |  |  |  |

[PROGRAM SETUP]

START TIME 1
◄ 5:00 AM ►
☒ AM
■ PM

STATION RUNTIME — 1504

| NO. | NAME | RUNTIME HH | RUNTIME MM | ET ADJUSTED RUN TIME HH | ET ADJUSTED RUN TIME MM |
|---|---|---|---|---|---|
| 1 | ENTRY SHRUBS | 00 | 40 | 00 | 36 |
| 2 | TURF POPUPS | 1 | 00 | 00 | 53 |
| 3 | BASEBALL ROTORS | 00 | 30 | 00 | 27 |
| 4 | BASEBALL POPUPS | 00 | 40 | 00 | 36 |
| 5 | SOCCER ROTORS | 00 | 30 | 00 | 27 |

— 1514  — 1516

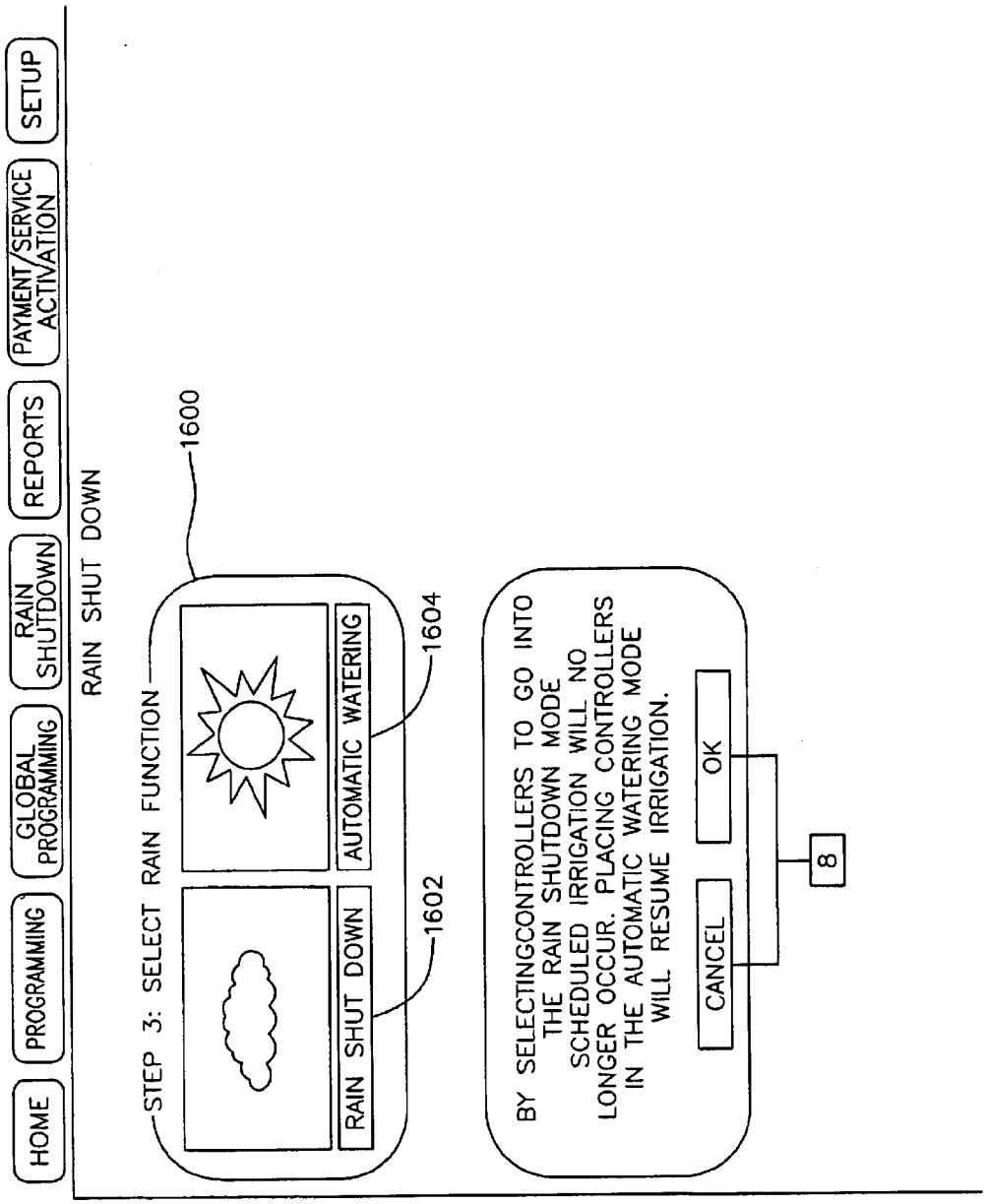

INTERNET-ENABLED CENTRAL IRRIGATION CONTROL

CROSS-REFERENCE TO RELATED APPLICATION

The present application claims priority of U.S. Provisional Patent Application No. 60/338,740 filed Nov. 5, 2001, the contents of which are incorporated by reference as if fully stated herein.

BACKGROUND OF THE INVENTION

The present invention relates generally to the field of irrigation controllers and more particularly to integrating irrigation controllers into a communications network.

With water resources dwindling across the country the need to conserve and preserve is more prevalent as time goes on. Many local water purveyors have implemented tiered rate structures as monetary incentives to stimulate water conservation. Additionally budgetary constraints have been imposed and harsh penalties levied for those exceeding the budgetary constraints. A large user of water resources is the landscape industry. This industry can be subdivided into residential and commercial sectors. Entities in the commercial sector include municipalities that include parks, schools, and streetscapes. Other typical commercial users include: colleges and universities, homeowner associations, business parks, golf courses, cemeteries, and airports.

In many parts of the country these areas are irrigated via irrigation controllers. An irrigation controller is a timer that determines what days and times individual areas or stations are to be watered. An irrigation controller may include a microprocessor driven programmable device that retains program data and is capable of turning on and off individual 24 VAC stations or valves based upon program data resident within nonvolatile RAM. The primary goal of the landscape maintenance staff is to keep the landscapes looking lush, green, and trim. Often times this is at the expense of using excessive water. In order to conserve water, it may be necessary to properly adjust station runtimes on a weekly and often times on a daily basis. These adjustments are required due to seasonal as well as daily weather conditions at the irrigated site. Since most irrigation controllers control a large number of individual stations and an entity may have a large number of controllers, it may not be feasible to have maintenance workers performing detailed adjustments to stations on a regular basis via manual means.

A central control system is a tool which allows maintenance staff to automatically adjust irrigation controllers from a central location, namely a personal computer. In addition, central control systems may include the ability to automatically adjust irrigation schedules based on evapotranspiration values. An evapotranspiration value represents the total water loss from soil and vegetation over a predefined time period. This water loss includes water lost by direct evaporation and by transpiration from the plant surfaces.

Central control systems have been popular for more than a decade. The current shortcomings of present day central control systems include:

They usually are relatively expensive to purchase because they have many hardware pieces.

They require a level of support that the typical user does not have expertise in such as communications technology and a significant amount of custom circuitry.

Because they have many elements, namely, cables, circuit boards, connections, etc. the reliability of these systems is degraded by the sheer number of components.

Because they have many elements the service of these systems is best performed by factory trained individuals.

Only larger irrigation departments have professional staff capable of being trained to operate large and sophisticated central control systems.

These systems typically utilize one or more weather stations. The costs of these weather stations are fairly expensive.

Most systems sold today have relatively expensive software.

As a consequence of these limitations, the advantages of central controlled irrigation systems are not feasible for smaller sized systems.

SUMMARY OF THE INVENTION

A method and apparatus for Internet-enabled irrigation control. An irrigation controller is coupled to a wide area network, such as the Internet, via a wireless carrier network. The irrigation controller has a unique identifier which makes the irrigation controller addressable by an irrigation server located on the Internet. The irrigation controller is capable of stand-alone operation and may be programmed by a user communicating with the irrigation controller using the irrigation server and the wireless carrier. The user may also send immediate commands to the irrigation controller such as rain shutdown commands. In addition, the irrigation controller may transmit status messages back to the irrigation server such as irrigation station faults and excessive flow alarms. The irrigation server saves the status messages in a database for later retrieval by the user. In addition, the irrigation server may also transmit status and alarm messages to the user via email or by telephone.

In one aspect of the invention, an irrigation controller is operated over a communications network such as the Internet. The irrigation controller is coupled to a server through the communications network. The irrigation controller receives an irrigation program from the server through the communications network during a setup and configuration procedure. The irrigation controller then receives irrigation program modification data from the server through the communications network as needed. The irrigation controller modifies the irrigation program using the irrigation program modification data and generates irrigation station control signals using the modified irrigation program.

In another aspect of the invention, the irrigation program includes an irrigation station runtime and the irrigation program modification data includes weather data. The irrigation controller uses the weather data to modify the irrigation controller by recalculating the irrigation station runtime using the weather data. The kind of data included in the weather data varies depending on the needs and capabilities of the irrigation controller. In one aspect of the invention, the weather data includes evapotranspiration data. In another aspect of the invention, the weather data includes rain sensor data. In another aspect of the invention, a single weather station may be shared by a plurality of irrigation stations by the server receiving the weather data from a second irrigation controller coupled to a weather station.

In another aspect of the invention, the irrigation program modification data includes a program percent value that is used to modify the irrigation program by the irrigation controller by recalculating the irrigation station runtime using the program percent value.

In another aspect of the invention, the irrigation program may be further modified using irrigation program start times and irrigation program water days included in the irrigation program modification data.

In another aspect of the invention, the irrigation controller generates status data and transmits the status data to the server through the communications network. The server may then generate an email message using the status data and transmit the email message to an email server through the communications network.

In another aspect of the invention, a user may couple a client to the server through the communications network and transmit the irrigation program modification data to the server using the client. In another aspect of the invention, the server is coupled to a database and stores the irrigation program modification data in the database.

In another aspect of the invention, the irrigation controller receives a command from the server through the communications network and executes the command immediately.

In another aspect of the invention, the communications network includes a wireless carrier. The wireless carrier may include a network employing any wireless communications protocol such as a two-way paging wireless network, a cellular digital packets network, a code division multiple access network, a global system for mobile communications network, or a general packet radio service network.

BRIEF DESCRIPTION OF THE DRAWINGS

These and other features, aspects, and advantages of the present invention will become better understood with regard to the following description, appended claims, and accompanying drawings where:

FIG. 12 is a user interface graphic of an irrigation controller and programming setup graphical user interface in accordance with an exemplary embodiment of the present invention;

FIG. 13 is an irrigation controller setup graphical user interface in accordance with an exemplary embodiment of the present invention;

FIG. 15 is a user interface graphic of an evapotranspiration programming graphical user interface in accordance with an exemplary embodiment of the present invention;

FIG. 16 is a user interface graphic of a rain shut down graphical user interface in accordance with an exemplary embodiment of the present invention;

DETAILED DESCRIPTION

Figure 1:
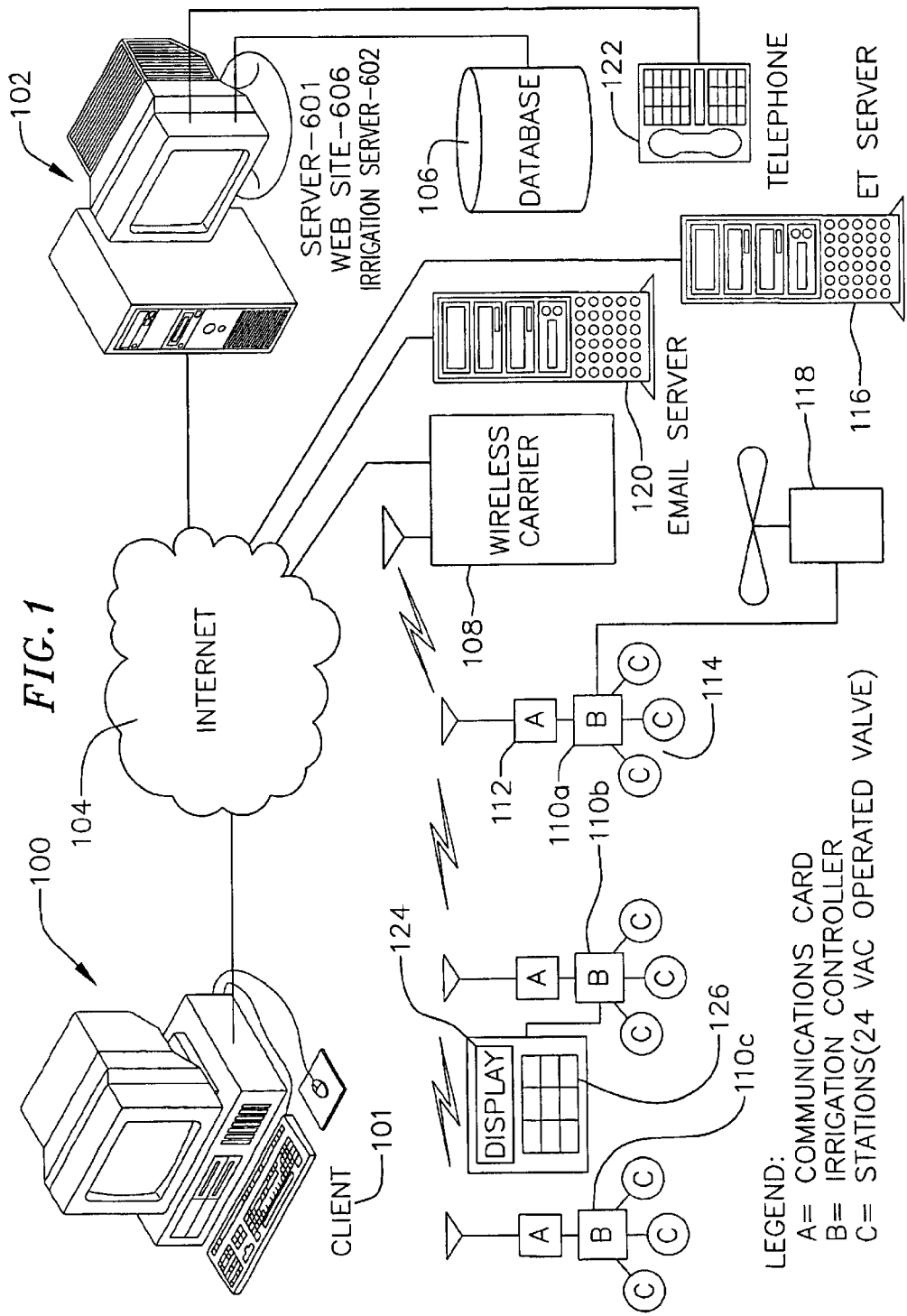
FIG. 1 is a block diagram of a central irrigation control system in accordance with an exemplary embodiment of the present invention.

FIG. 1 is a block diagram of an irrigation control system in accordance with an exemplary embodiment of the present invention. A user uses the irrigation control system to operate one or more irrigation controllers that are distributed in areas the user wants to irrigate. By collecting the operations of the irrigation controllers into a single irrigation control system, a centralized irrigation control system is created from a plurality of distributed irrigation controllers. A user uses the centralized irrigation control system to transmit irrigation programs to the distributed irrigation controllers and the distributed irrigation controllers use the programs to operate irrigation stations. An irrigation program (or simply program) is data that resides within an irrigation controller which may include, but is not limited to: the time(s) in the day that the program starts; the days in the week that the program will start; the time duration that a valve station shall remain on, also known as runtime; various setup parameters to allow a program to be tailored for a specific irrigation application, for example, programs may be setup to be either dependent or independent of evapotranspiration and dependent or independent of rainfall; usage of master valves; and flow enabled operations.

A client host 100, such as a Personal Computer (PC), hosts a client 101, such as a commercial Web browser and is coupled through a communications network, such as the Internet 104, to an irrigation host 102. A server 601 having an irrigation server portion 602 and a Web-site portion 606 resides on the irrigation host. A user uses the client to access the Web-site portion of the server to put irrigation programs into an irrigation database 106. The irrigation server is also coupled to the irrigation database and may access the programs stored there by the Web-site.

The irrigation server is also coupled to one or more wireless carriers, such as wireless carrier 108, through the Internet. The wireless carrier is further coupled to one or more irrigation controllers, such as irrigation controllers 110a, 110b, and 110c through wireless communications cards, such as communications interface card 112. The irrigation server uses the wireless carrier to communicate with each of the irrigation controllers and transmit irrigation programs from the database to the irrigation controllers.

The purpose of the Internet is threefold: (1) it provides the interface to the user to support all central related activities; (2) it is the transport mechanism used to get user initiated communication requests from the user to the wireless service provider; and (3) it is the transport mechanism used to get acknowledgments and alarm events from the irrigation controllers back to the irrigation server for storage and later retrieval by the user.

The purpose of the wireless carrier is to provide and maintain a network of wireless cells/sites throughout the United States or any significant country/region. The wireless carrier allows for two-way communications. Two-way communications allow communications to be both sent and received from any location. A common day wireless carrier which is analogous to the wireless carrier depicted above would be a cell phone provider. The difference between the cell phone provider and the wireless provider is that the cell phone provider is primarily designed to handle voice traffic and some data while the wireless data provider is designed to handle data transmissions. In most instances data transmissions are initiated by devices rather than people. Another difference is that the wireless carrier also has an interface so that Web-sites can initiate as well as receive data transmissions. In the United States there are several wireless carrier networks capable of fulfilling the requirements of this invention. Selection of a wireless carrier is a function of several factors: data rate cost of service; extended coverage area; availability of low cost third party equipment (transceivers) that can be interfaced to an irrigation controller; maturity/longevity of the carrier; and the vulnerability of the wireless technology to product obsolescence. In different exemplary embodiments of the present invention, multiple solutions are utilized including but not limited to: two-way paging, Cellular Digital Packet Data (CDPD), Global System for Mobile Communications (GSM), General Packet Radio Service (GPRS), and Code Division Multiple Access (CDMA) data.

In an irrigation controller in accordance with an exemplary embodiment of the present invention, the irrigation controller uses evapotranspiration data to modify the programs used by the irrigation controller. Evapotranspiration data may be entered into the irrigation controller in a variety of ways. In one embodiment of the present invention, evapotranspiration data may be received by the irrigation server from an evapotranspiration server 116 and transmitted to the irrigation controller using the communications link created by the combination of the communications network and the wireless carrier.

In slightly more detail, the user initiates operation upon connection to the Internet and by login to the Web-site. The web-site login process validates the authenticity of the user, including access rights, account status, and security issues. Once access has been granted the user may select any number of individual screens to support the desired operation. Activities may include programming and setup of an irrigation controller, review of the daily evapotranspiration values, alarm review, and interactive manual operations with irrigation controllers.

In addition to support of user initiated activities, the irrigation server may also collect daily evapotranspiration data throughout the country. Evapotranspiration data may be collected from a variety of sources, including public domain state agencies that maintain servers with evapotranspiration data, such as evapotranspiration server 116, as well as privately owned weather stations capable of measuring evapotranspiration. Depending on the user's access rights to the web-site, the user may elect to have daily evapotranspiration automatically distributed to various irrigation controllers within the user's account domain. This distribution process will continue on a daily basis as long as the user has maintained a positive account status. The irrigation controllers receive the daily evapotranspiration data and make intelligent station program adjustments in order to conserve water.

The irrigation controller retains and recalculates program data such as station runtimes on an as-needed basis. The irrigation controller may also have sensory inputs capable of measuring flow, rain, evapotranspiration, and electrical shorts on station field wiring. The irrigation controller is a microprocessor driven device with a user interface (keyboard and display), non-volatile RAM to retain pertinent setup and program data during power outages/glitches, a clock with retention capabilities during power outages/glitches and firmware to make the device work.

In another irrigation controller in accordance with an exemplary embodiment of the present invention, the irrigation controller also has the ability to alter or recalculate station runtimes using historic evapotranspiration data. The irrigation controller provides a location to store the historic evapotranspiration on a monthly basis. The irrigation controller also maintains a reference evapotranspiration value. Each time an irrigation station is to operate the irrigation controller computes how long the station is to operate as follows:

Adjusted station runtime = programmed station runtime ×

(historic evapotranspiration / reference evapotranspiration)

In another irrigation controller in accordance with an exemplary embodiment of the present invention, the irrigation controller also has the ability to alter or recalculate its station runtimes using an evapotranspiration measuring device connected directly to its input terminals, such as a weather station 118. In this case the historic data is not used. With an evapotranspiration measuring device real or actual site evapotranspiration is utilized. This may be an improvement over the use of historic evapotranspiration data since daily or weekly events such as storms, heat spells, etc. can be accounted for by the irrigation controller.

Evapotranspiration values may be calculated by collecting weather data, such as wind speed, temperature, humidity, solar radiation, and combining these collected weather data with input environmental data such as albedo of the plant canopy. For example, evapotranspiration may be calculated using the Penman equations:

$$U=(AH+0.27E)/(A+0.27)$$

Where:

$E=0.35(e_a-e_d)(1+0.0098w)$ $H=R(1-r)(0.18+0.55S)-B(0.56-0.92 e_d^{0.5})(0.10+0.90S)$ $e_a$=saturation vapor pressure at the mean temperature
$e_d$=saturation vapor pressure at the dew point temperature
w=average wind speed
R=monthly radiation
r=albedo or reflectivity
S=percent sunshine expressed as a decimal
B=longwave radiation
A=slope of saturation vapor pressure curve
E=potential evaporation H=heat budget U=potential evapotranspiration In another irrigation controller in accordance with an exemplary embodiment of the present invention, evapotranspiration data is obtained from the irrigation server. The irrigation server may collect evapotranspiration data from several sources and disseminate this data to specific irrigation controller locations. Regardless of the source of the evapotranspiration data, the irrigation controller recalculates station runtimes in the same fashion. Obtaining evapotranspiration data from the irrigation server allows the irrigation controller to make daily adjustments based upon site specific weather conditions while foregoing connectivity to a weather station.

In another irrigation controller in accordance with an exemplary embodiment of the present invention, evapotranspiration data is obtained by the irrigation server from an irrigation controller coupled to a weather station. The irrigation server receives the evapotranspiration data and redistributes it to other irrigation controllers as appropriate. For example, if a plurality of irrigation controllers are located in one physical area, they may all share evapotranspiration data collected from one of the plurality of irrigation controllers.

In another irrigation controller in accordance with an exemplary embodiment of the present invention, the irrigation controller receives weather data from the irrigation server and calculates an evapotranspiration rate itself.

In an irrigation controller in accordance with an exemplary embodiment of the present invention is capable of stand-alone operation, namely, operation without the connectivity of the Internet. In the stand-alone configuration, the user uses input and display devices, such as display 124 and keyboard 126 coupled to the irrigation controller, to input program and setup data directly into the irrigation controller. The irrigation controller initiates irrigation to the programmed stations at the specified times and durations. The irrigation stations or valves, such as valves 114, are coupled to the irrigation controller via terminal connections capable of supplying 24 VAC at the appropriate terminal for the appropriate time.

Figure 2:
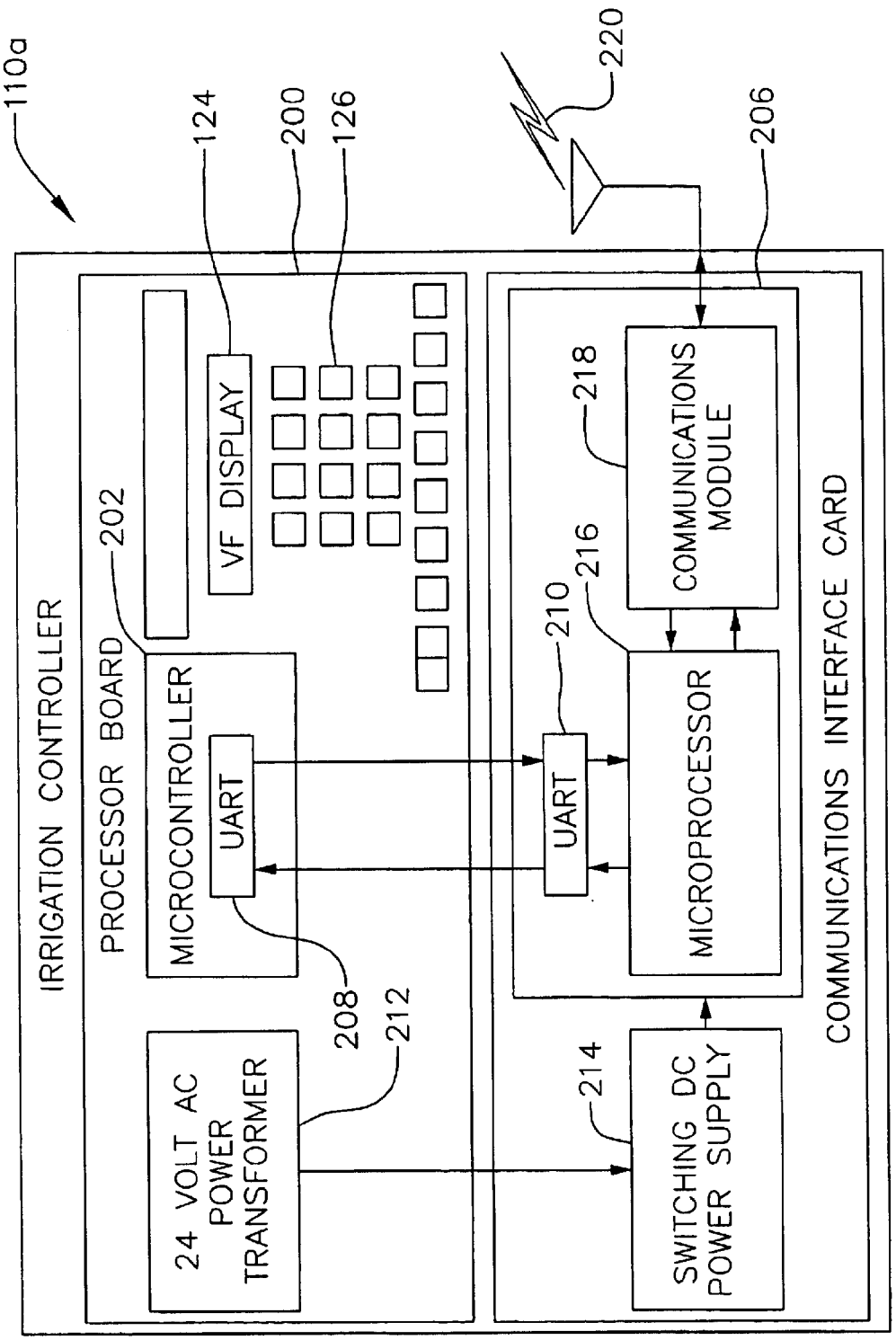
FIG. 2 is a block diagram of an irrigation controller in accordance with an exemplary embodiment of the present invention.

FIG. 2 is a block diagram of an irrigation controller in accordance with an exemplary embodiment of the present invention. The primary functions of the irrigation controller include:

1) Running or executing irrigation schedules independently of any communications connectivity. This is accomplished by applying 24 VAC to various stations at the appropriate time(s);
2) Supporting full duplex two-way wireless communications via the wireless carrier;
3) Intelligently processing local field alarm events (station or mainline flow failures, as well as station wiring faults). Once the alarm condition is dealt with the controller initiates a communications transmission via the wireless carrier to inform the website of the alarm event;
4) Receiving daily weather data in order to adjust irrigation schedule runtimes to facilitate water savings; and
5) Providing a local user interface so that users may modify irrigation schedules and control all aspects of their irrigation needs.

An irrigation controller 110a includes a processor board 200 having a microcontroller 202 coupled to a display 124 and a keyboard 126. The processor board is coupled to a communications card 206 by a Universal Asynchronous Receiver-Transmitter (UART) 208 for asynchronous serial communication with a corresponding UART 210 located on the communications interface card. The communications interface card is powered by a power transformer 212 located on the processor board coupled to a switching power supply 214 located on the communications interface card. The communications interface card is the irrigation controller's local conduit for sending and receiving data over the airwaves 220. The communications interface card includes a microprocessor 216 and a communications module adapted for communications using a specific wireless communications protocol.

In one irrigation controller in accordance with an exemplary embodiment of the present invention, the irrigation controller is capable of reading pertinent status and control data that is internal to the communications interface card. Data such as signal strength and diagnostics can be presented to the user via the irrigation controller's display and transmitted to the irrigation server as part of the irrigation controller's status data or may be presented by the irrigation controller locally using the irrigation controller's display.

In one irrigation controller in accordance with an exemplary embodiment of the present invention, the irrigation controller functions are handled by the microprocessor on the communications interface card. In this embodiment, the irrigation controller and the communications interface card are a single device.

Figure 3:
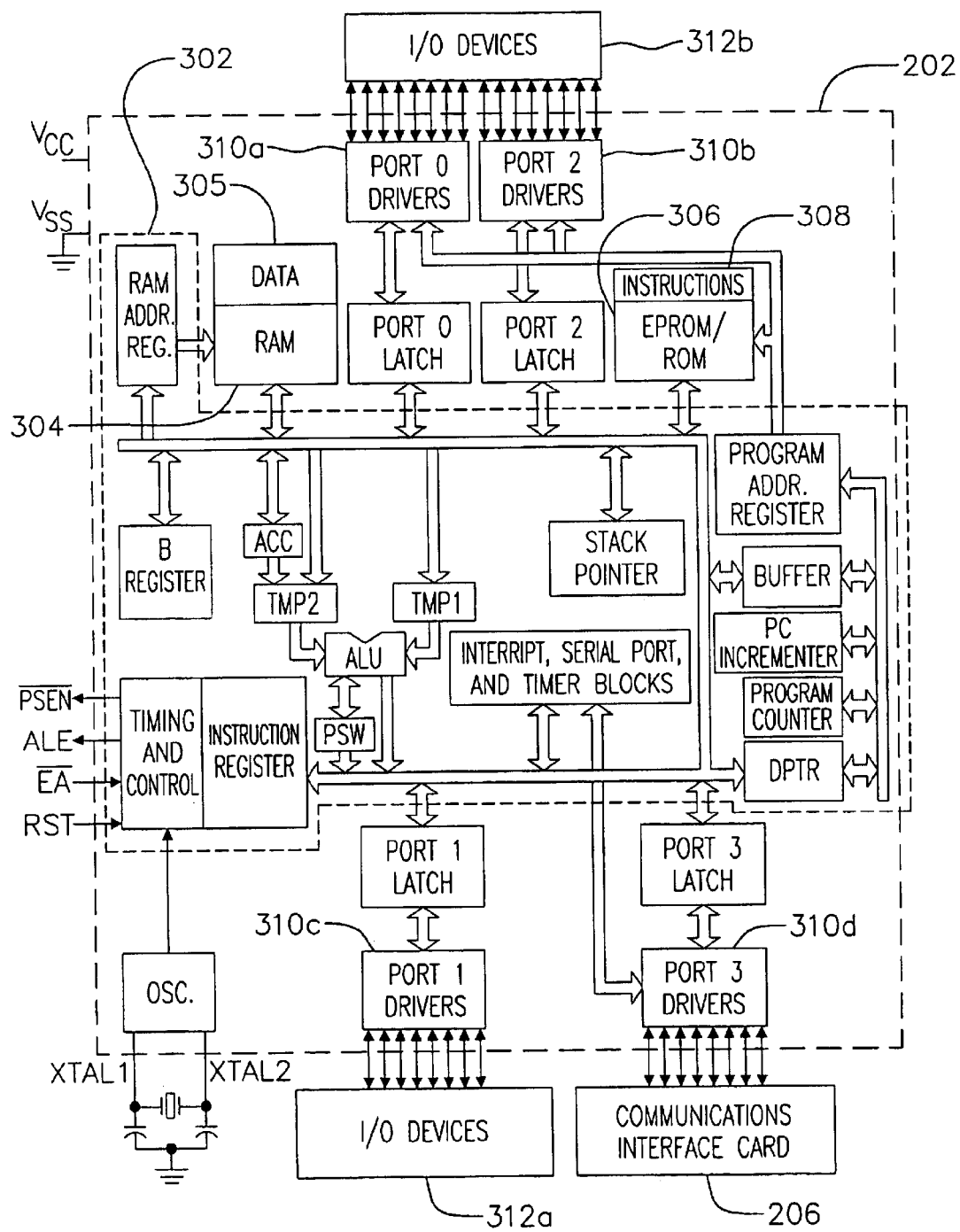
FIG. 3 is a block diagram of a microcontroller used in an irrigation controller in accordance with an exemplary embodiment of the present invention.

FIG. 3 is a block diagram of a microcontroller used in an irrigation controller in accordance with an exemplary embodiment of the present invention. A microcontroller 202, includes a processor portion 302 coupled to a Random Access Memory (RAM) 304 and a permanent or semipermanent storage memory such as Read Only Memory (ROM) 306. Programming instructions 308 are stored in the ROM and are executable by the processor to implement the features of an irrigation controller as described herein. The RAM includes a portion for storage of data 305 including irrigation controller configuration data and irrigation station program data for use by the irrigation controller. The processor is further coupled to Input/Output (I/O) ports, such as ports 310a, 310b, 310c, and 310d for receiving input signals and transmitting output signals to I/O devices such as I/O devices 312a and 312b. Input signals may include sensor signals received from rain or freeze sensors, water flow signals received from flow sensors, and weather data signals received from a weather station. The output signals may include irrigation station control signals for turning individual irrigation stations on and off.

The processor is further coupled to a communications interface card, such as communications interface card 206, through an I/O port, such as I/O port 310d. The processor uses the communications interface card to communicate with the previously described wireless carrier 108 and thus eventually to the previously described irrigation server 602 (both of FIG. 1).

Figure 4:
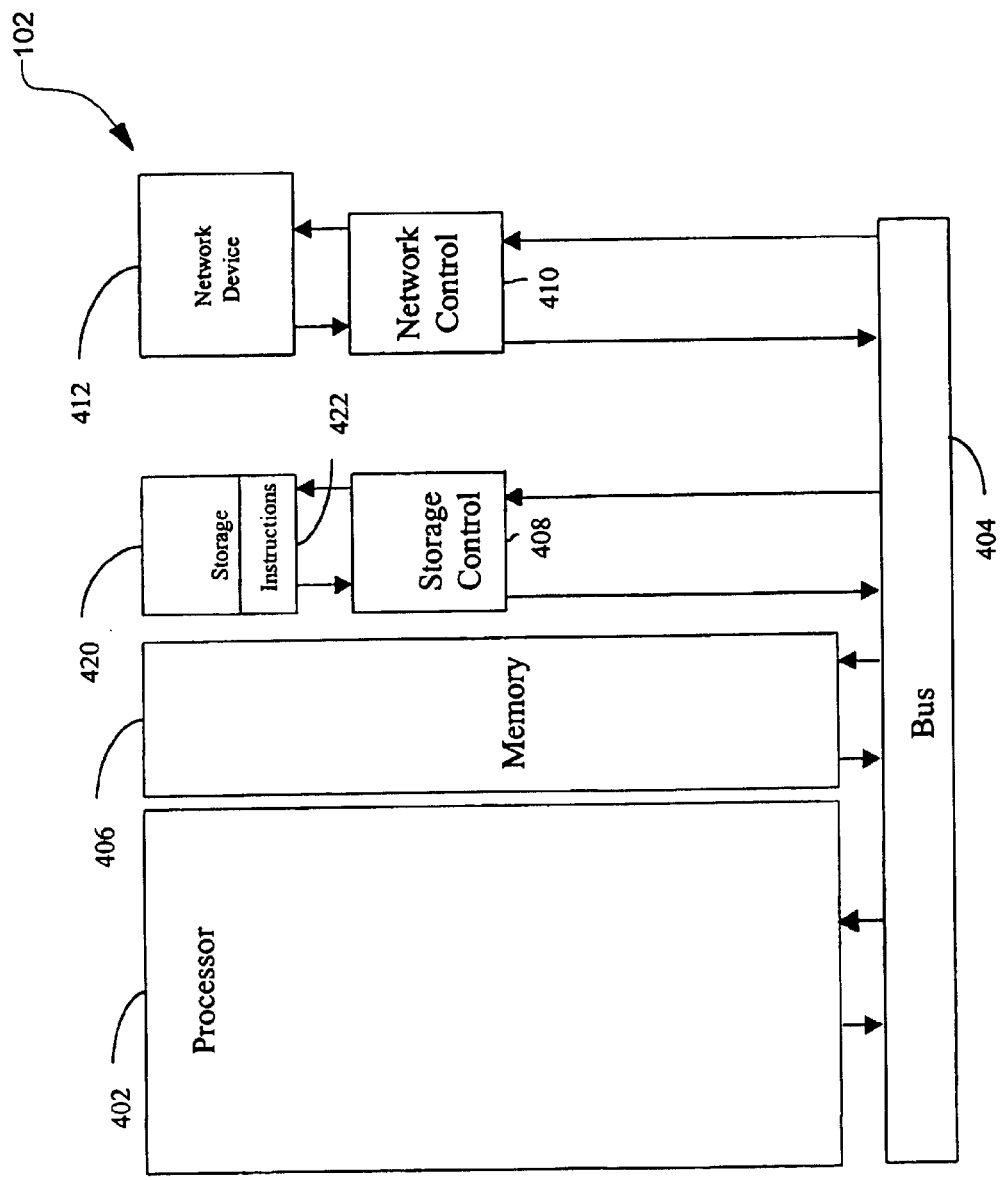
FIG. 4 is a block diagram of the architecture of a host used in an irrigation control system in accordance with an exemplary embodiment of the present invention.

FIG. 4 is a block diagram of the architecture of a host used in an irrigation control system in accordance with an exemplary embodiment of the present invention. Irrigation host 102 includes a processor 402 coupled via a bus 404 to a memory device 406, a storage device controller 408, and a network device controller 410. The processor uses the network device controller to control the operations of a network device 412 which is adapted for communications using a transport protocol to transmit and receive data across a communications network to other hosts.

The storage controller is coupled to a storage device 420 having a computer readable storage medium for storage of program instructions 422 executable by the processor. The program instructions are stored in the storage device until the processor retrieves the program instructions and stores them in the memory. The processor then executes the program instructions stored in memory to implement the features of either a Web-site or an irrigation server as described herein.

Figure 5:
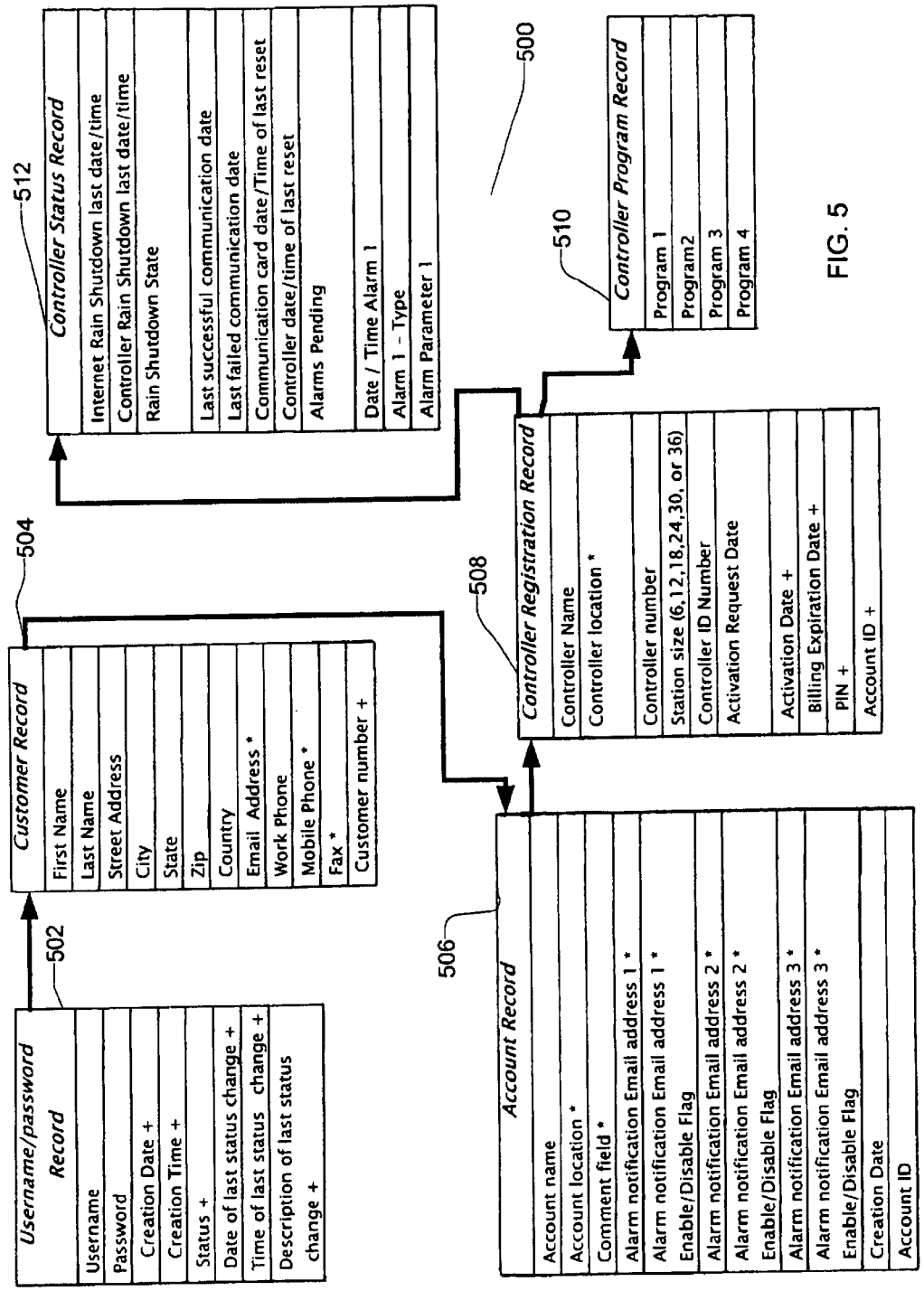
FIG. 5 is a database diagram of an irrigation control system database in accordance with an exemplary embodiment of the present invention.

FIG. 5 is a database diagram of an irrigation control system database in accordance with an exemplary embodiment of the present invention. The design utilizes a relational database 106 in order to organize information and data needed to operate an irrigation controller by a user from the Web-site. The relational database keeps track of many user related items including account and billing data and controller programming data including start times, water days, station runtimes and all pertinent setup data. In the diagram, a "+" indicates a field that is filled in by the Web-site and not by the user and a "*" indicates a field that is optional for the user to enter.

A username and password record 502 has fields used to identify a user. A username is selected by the user and is associated with a password. A status field is initially "active" for each created username. An administrator of the web-site may however change this account to "suspend" in which case the user will no longer be able to log in. The username and password record further includes a creation date field, a creation time field, a date of last status change field, a time of last status change field, and a description of last status change field. Each username and password points to a customer record 504. Each customer record points to one or more account records, such as account record 506, and each account record points to one or more controller records, such as controller registration record 508, controller program record 510, and controller status record 512.

The customer record is filled in by the same individual who selected the username/password. The customer record includes a first name field, a last name field, a street address field, a city field, a state field, a Zip code field, a country field, an email address field, a work phone field, a mobile phone field, a fax field, and a customer number field. The customer number stored in the customer number field by the Web-site is encoded as follows:

YYDDDNNN

Where:

YY=the year

DDD=day number of the year since January 1

NNN=a consecutive number which increments each time a new customer completes the new registration page.

This number is cleared each day at midnight.

For Example: Customer completes the new registration page at 9:00 AM on Jan. 20, 2002. This customer is the third new customer on this day. The new customer number would then be Customer number=02020003.

When a user activates an irrigation controller for wireless network service and email message will be generated by the irrigation server and sent to the email address found in the customer service record.

The account record includes data for each account which has been created by the customer. An account record includes an account name field, an account location field, a comment field, a plurality of alarm notification email address fields with associated alarm notification email address enable/disable flag fields, a creation date field, and an account ID field.

An irrigation controller registration record ties an irrigation controller to an account record and includes specific data to "activate" an irrigation controller for wireless Internet service. The irrigation controller registration record includes an irrigation controller name field, an irrigation controller location field, an irrigation controller number field, a station size field, a controller id number field, an activation request date field, an activation date field, a billing expiration date field, a Personal Identifier Number (PIN) field, and an account ID field. An irrigation controller number is a numerically incrementing number based upon the order of the irrigation controllers in a user defined list. The user is allowed to change the order of the irrigation controller which will in turn change the irrigation controller number. The value stored in the account ID field will be the account that an irrigation controller is associated with.

The irrigation controller programming record includes user changeable data associated with an irrigation controller. This includes water days, start times, runtimes, setup data as well as evapotranspiration setup data. A program field in the irrigation controller program includes start times, station runtimes, water days, flow setup parameters, irrigation setup parameters, program setup parameters, and evapotranspiration setup parameters.

The irrigation controller status record includes data about the current status of individual irrigation controllers. The irrigation controller status record includes an Internet rain shutdown record, an irrigation controller rain shutdown record, a rain shutdown state record, a last successful communication date record, a last failed communication date record, a communications card reset date and time record, an irrigation controller reset date and time record, a total alarms pending at an irrigation controller record, and a plurality of alarm type, alarm parameter, and alarm date and time records.

Figure 6:
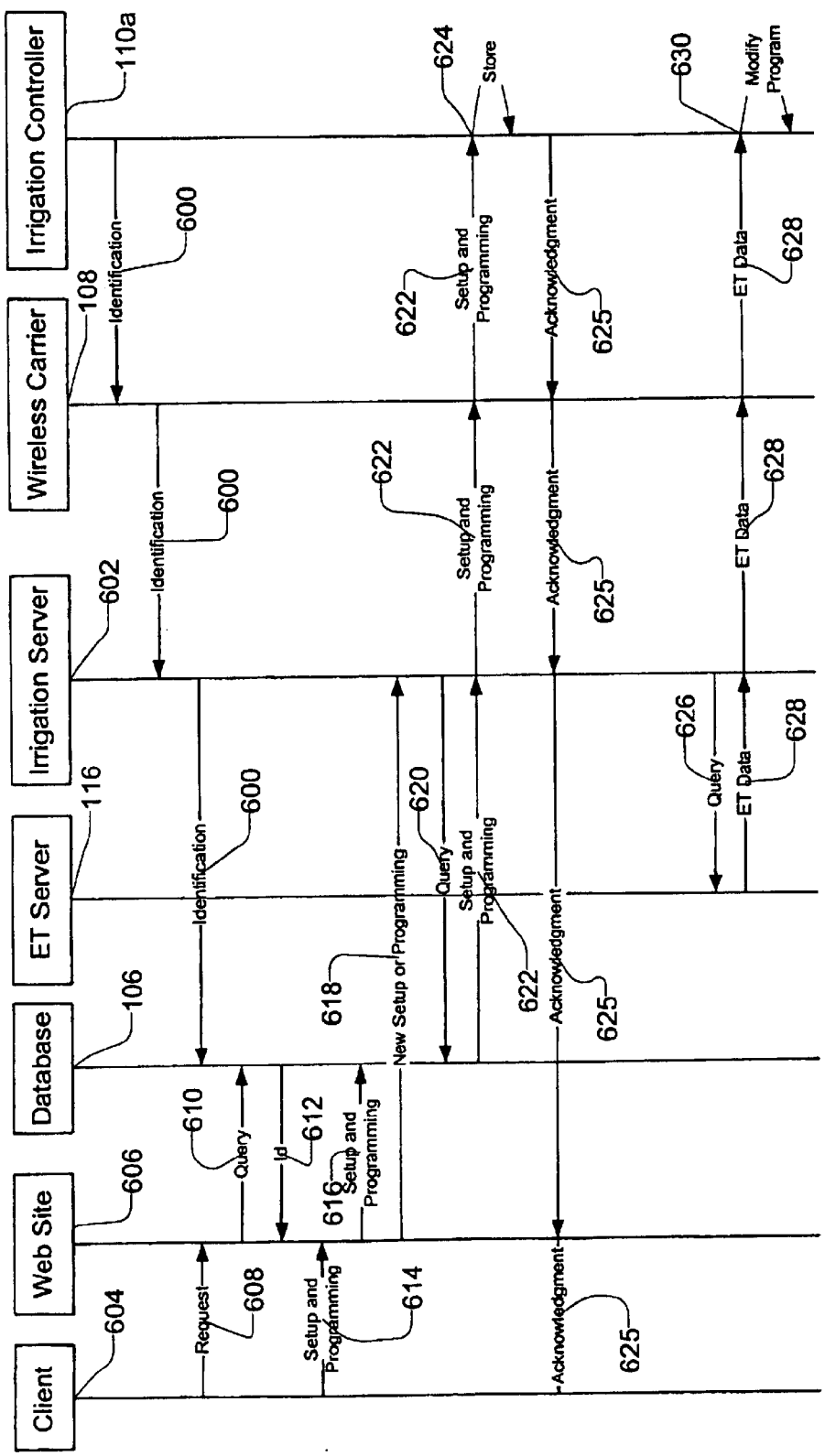
FIG. 6 is a sequence diagram of an irrigation controller configuration process in accordance with an exemplary embodiment of the present invention.

FIG. 6 is a sequence diagram of an irrigation controller setup process in accordance with an exemplary embodiment of the present invention. An irrigation controller 110a is installed at a field location. Upon being powered, the irrigation controller transmits identification data 600 to a wireless carrier 108. The wireless carrier forwards the irrigation controller identification data to an irrigation server 602. The irrigation server then puts the irrigation controller identification data in a database 106. In this way, an irrigation controller identifies itself as an active irrigation controller available for programming by a user.

A user uses a client 604 to access a Web-site 606 and transmits a request 608 to the Web-site to register and setup the irrigation controller. The client transmits a request 608 to the Web-site including an identification of the irrigation controller to be setup. The Web-site generates a query 610 and uses the query to query the database for the irrigation controller. If the irrigation controller has been identified to the system, the database sends a confirmation 612 back to the Web-site. The user then enters setup and programming data 614 into the client and the client transmits the setup and programming data to the Web-site which in turn puts the setup and programming data into the database. The Web-site then sends a message 618 to the irrigation server that setup and programming data is available for the irrigation controller. The irrigation server transmits a query 620 to the database and receives setup and programming data 622 in response. The irrigation server forwards the setup and programming data to the wireless carrier which in turn forwards the setup and programming data to the irrigation controller. The irrigation controller then stores (624) the setup and programming data for later use.

The setup and programming data may include an entire irrigation program or may include only irrigation program modification data for a previously stored irrigation program.

For example, a user may want to modify only the runtime for a single irrigation station specified in the previously stored irrigation program. In this case, transmission of the entire setup and programming data from the irrigation server to the irrigation controller is unnecessary as only a single runtime has changed. Therefore, the irrigation server only sends a minimal amount of program data to the irrigation controller which the irrigation controller uses to modify the previously stored irrigation program.

In one embodiment of an irrigation controller in accordance with an exemplary embodiment of the present invention, the irrigation controller transmits an acknowledgment 625 to the wireless carrier. The wireless carrier in turn propagates the acknowledgment to the irrigation server, to the web-site, and finally back to the client for display to the user. Acknowledgments may be generated any time the irrigation controller receives data from the wireless carrier. For example, the irrigation controller may acknowledge the receipt of programs, configuration or setup data, weather data, evapotranspiration data, etc. Generation and transmission of the acknowledgment may be accomplished in several ways. In one embodiment, acknowledgments are obtained indirectly from the communications network such as routing information for packets sent through the network. In another embodiment of an irrigation controller, the interface communications card generates and transmits acknowledgments upon receipt of data. In another embodiment of an irrigation controller, the irrigation controller generates the acknowledgment and uses the interface communications card for transmission.

In an irrigation control system in accordance with an exemplary embodiment of the present invention, the irrigation controller can use evapotranspiration data to modify a locally stored program. As previously described, one way the irrigation controller may obtain evapotranspiration data is from the irrigation server. The irrigation server transmits an evapotranspiration data query 626 to an evapotranspiration server 116 and receives evapotranspiration data 628 in return. The irrigation server transmits the evapotranspiration data to the irrigation controller via the wireless carrier. The irrigation controller then stores the evapotranspiration data for later use in modifying (630) stored irrigation programs as previously described.

Figure 7:
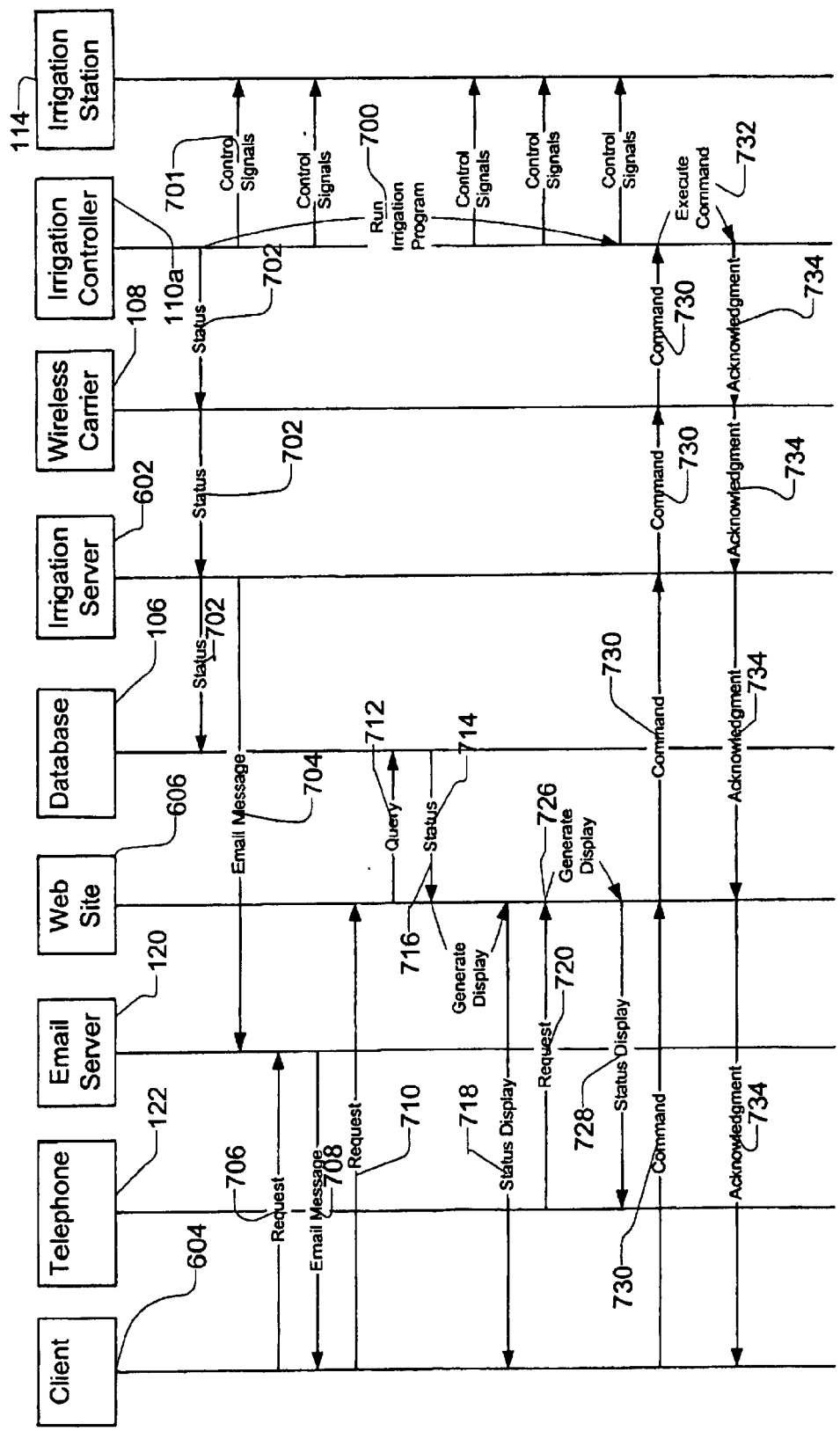
FIG. 7 is a sequence diagram of the operation of an irrigation controller in accordance with an exemplary embodiment of the present invention.

FIG. 7 is a sequence diagram of the operation of an irrigation controller in accordance with an exemplary embodiment of the present invention. In operation, an irrigation controller 110*a* executes (700) an irrigation program including irrigation station start and runtimes as previously described. The irrigation controller uses the program to generate irrigation station control signals, such as irrigation control signals 701, that are transmitted to an irrigation station 114. While the irrigation controller is running the irrigation programs, the irrigation controller transmits status data 702 to an irrigation server 602 via the wireless carrier 108 as previously described. The status data includes previously described alarm data about the operation of the irrigation controller and its coupled irrigation stations. The status data may also include data about other operational parameters as well. For example, the irrigation controller may be coupled to a weather station and the status data then includes local weather data useful in calculating evapotranspiration data for other irrigation controllers in the area. As another example, the status data may include data on any parameter for which the irrigation controller is configured to sense or calculate such as total on-time for a particular irrigation station, total flow through an irrigation station, etc.

The irrigation server receives the status data and puts the status data into a database 106 for future reference. The irrigation server may also generate a status email message 704 to be transmitted to an email server 120. A user, using a client 604, may access the email server and transmit a status email message request 706 to the email server and receive a status email message 708 in response. In addition, the email server may provide services for access using a telephone, a personal digital assistant, or other email enabled communications devices.

The user may also use the client to transmit a status request 710 to a Web-site 606. Included in the request is an irrigation controller identifier used by the Web-site to generate a query 712 that is transmitted to the database. The Web-site receives status data 714 from the database and generates (716) a status display document 718 suitable for display on the client, such as a Web-page or other form of document written in a mark-up language. The status display document is transmitted to the client and the client parses the status display document to generate a status display for use by the user.

A user may also use a telephone 122 to access the irrigation server and transmit a telephonic status request 720 to the Web-site. The Web-site receives the request and uses an irrigation controller identifier in the request to generate (726) a telephonic status display 728 for transmission to the telephone and presentation to the user. In one Web-site in accordance with an exemplary embodiment of the present invention, the telephonic status request and display are digital in nature, such as an electronic document written in a mark-up language suitable for use on a phone with textual or graphical display capabilities.

The user may also issue a command 730 to the irrigation controller using the client. A command is an instruction to the irrigation controller to do something as soon as the irrigation controller receives the instruction. The controller can transmit an execute command 732 and an acknowledgement 734 that it has recieved the command For example, a command may be to have the irrigation controller suspend an irrigation program for a day because it rained at the irrigation controller's location. In another irrigation controller in accordance with an exemplary embodiment of the present invention, a command may be sent by a user using a telephone. In other embodiments, a user may send an email message including a command to an email server coupled to the irrigation server. The irrigation server receives the email message and uses the email message to generate a command that is transmitted to the irrigation controller.

Figure 8:
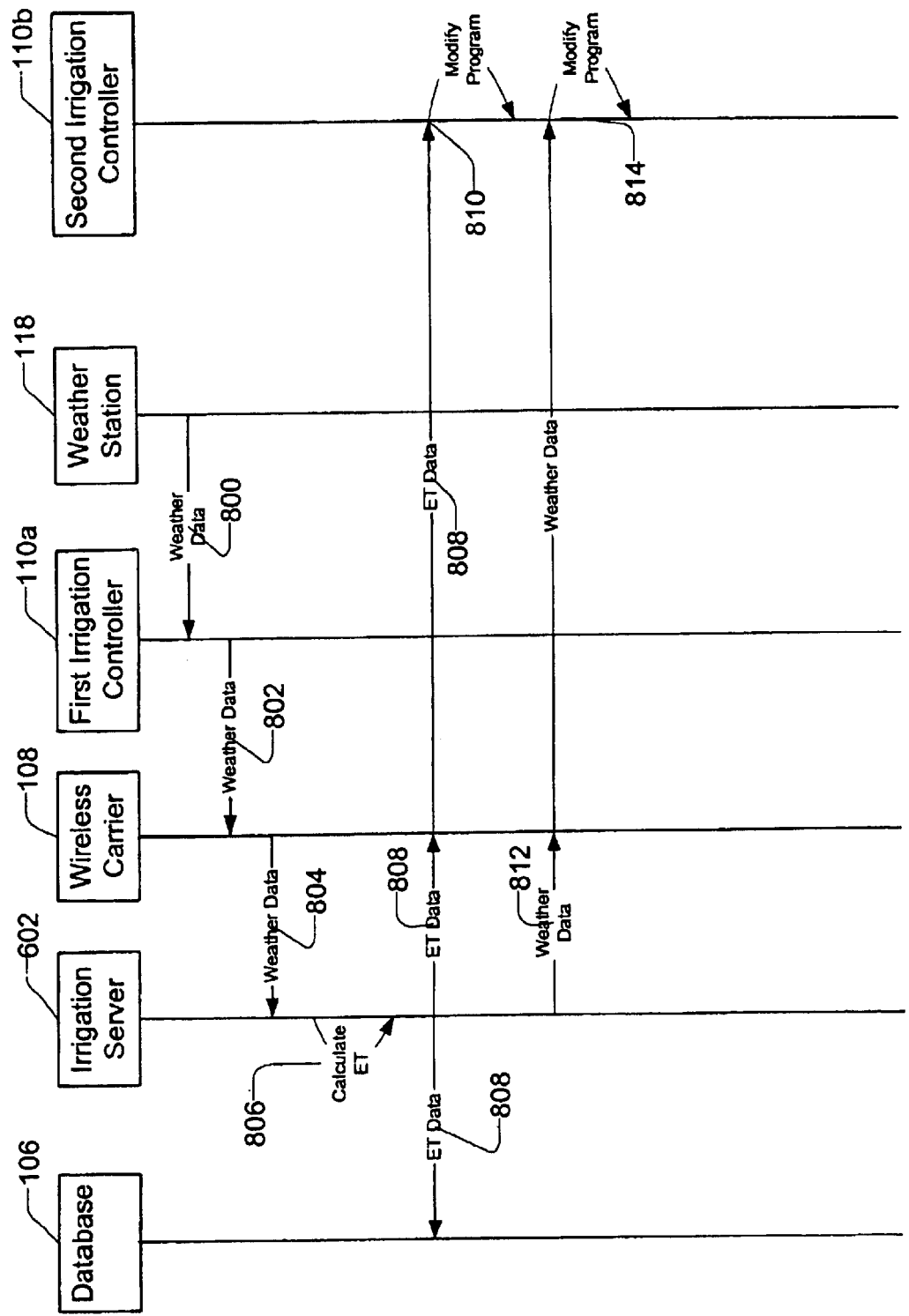
FIG. 8 is a sequence diagram of the operation of an irrigation controller coupled to a weather station in accordance with an exemplary embodiment of the present invention.

FIG. 8 is a sequence diagram of the operation of an irrigation controller coupled to a weather station in accordance with an exemplary embodiment of the present invention. As previously described, an irrigation controller, such as first irrigation controller 110*a* may be coupled to a weather station 118 and share weather data with other irrigation controllers, such as second irrigation controller 110*b*. The first irrigation controller receives weather data 800 from the weather station and in turn transmits the weather data to an irrigation server 602 via the wireless carrier. The irrigation server may then generate (806) evapotranspiration data 808 using the weather data. The irrigation server may then put the evapotranspiration data in the database for further use or transmit the evapotranspiration data to the second irrigation controller. When the second irrigation controller receives the evapotranspiration data, it modifies (810) previously stored irrigation programs accordingly. In another irrigation controller in, accordance with an exemplary embodiment of the present invention, the weather data includes data from rain sensors or freeze sensors. As with the evapotranspiration data, the irrigation server may transmit weather data 812 to the second irrigation controller which is used by the second irrigation controller to modify (814) its stored irrigation programs. For example, the second irrigation controller may respond to the rain sensor data by delaying running an irrigation program altogether.

Figure 9:
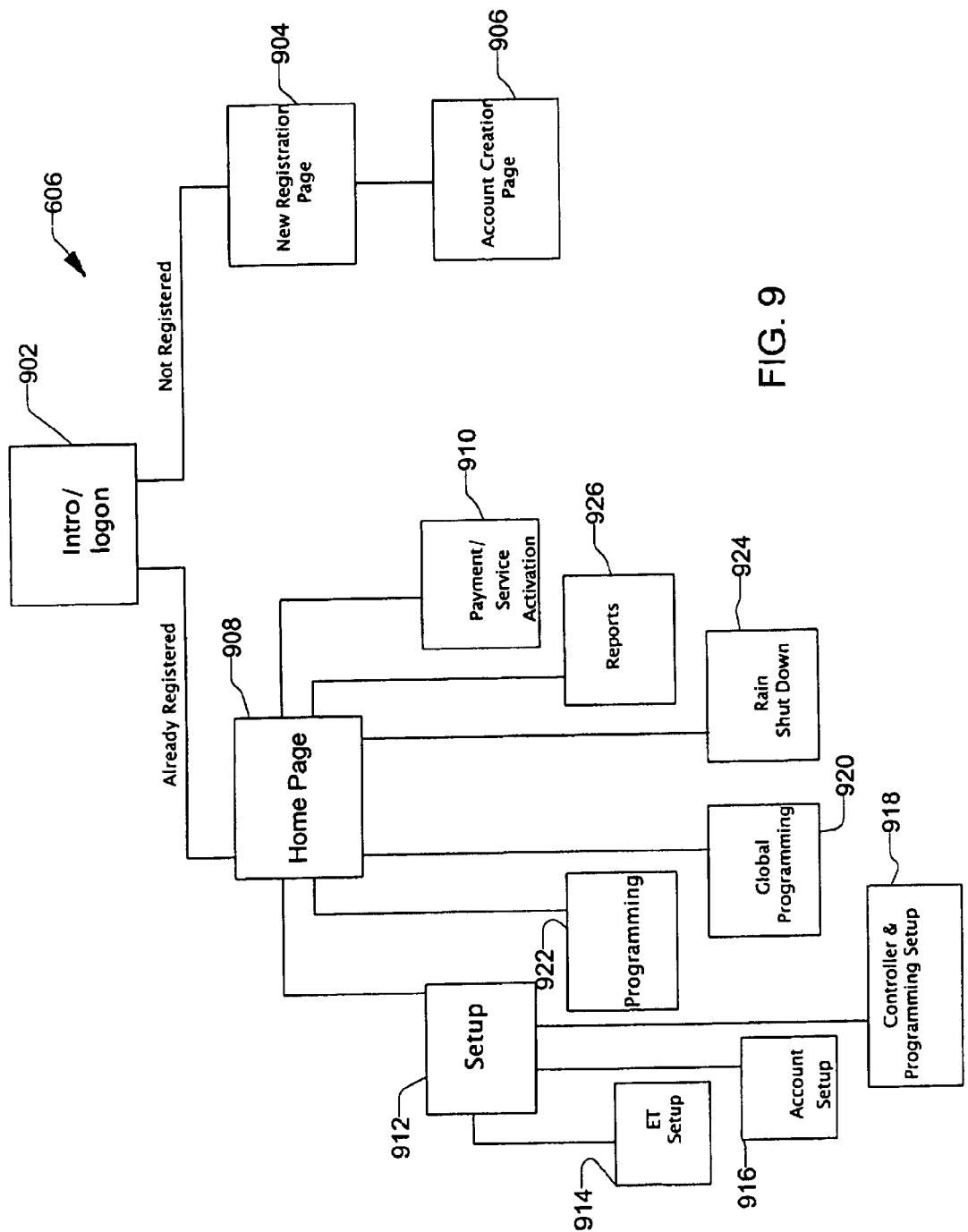
FIG. 9 is a block diagram of an irrigation control Web-site in accordance with an exemplary embodiment of the present invention.

FIG. 9 is a Web site diagram of an irrigation control Web-site in accordance with an exemplary embodiment of the present invention. The user may interact and communicate with the irrigation controller via the Internet utilizing a Web-browser. Users "logon" to a specially designed Web-site that provides the user interface to all operations of the irrigation controller. The Web-site communicates utilizing the wireless carrier and provides the following functions:

1) Create, modify or delete any irrigation schedule at any controller;
2) Automatically obtain daily weather data for specific sites where irrigation controllers are located;
3) Automatically send weather data to individual controllers;
4) Automatically initiate a rain shutdown command to controllers which may be affected by local rain;
5) Process any alarm conditions which may be received from any controller by recording them into the database and further disseminating these alarms via email to provide timely user notification;
6) Allow the user to control virtually any function of any controller via the website interface; and
7) Provide various report and troubleshooting tools.

A Web-site 606 includes an introduction and logon Web-page 902 as the first Web-page a user encounters when the user enters the Web-site. If the user does not have an account, the user may select a registration Web-page 904 for entry of registration data. Once the user is registered, the user may create an account for accessing an irrigation controller using an account creation page 906. Once the user has registered, the user may access a home Web-page 908. From the home Web-page, a user may access a payment/service activation page 910 and a setup Web-page 912. A user uses the setup Web-page to setup up the mode of operation of an irrigation controller. The user accesses an evapotranspiration setup Web-page 914 in order to setup an irrigation controller to use evapotranspiration data. The user also accesses an account setup 916, a controller and programing setup 918, a global programing setup 920, a programing setup 922, a rain shut down setup 924, and a reports setup 926.

Figure 10:
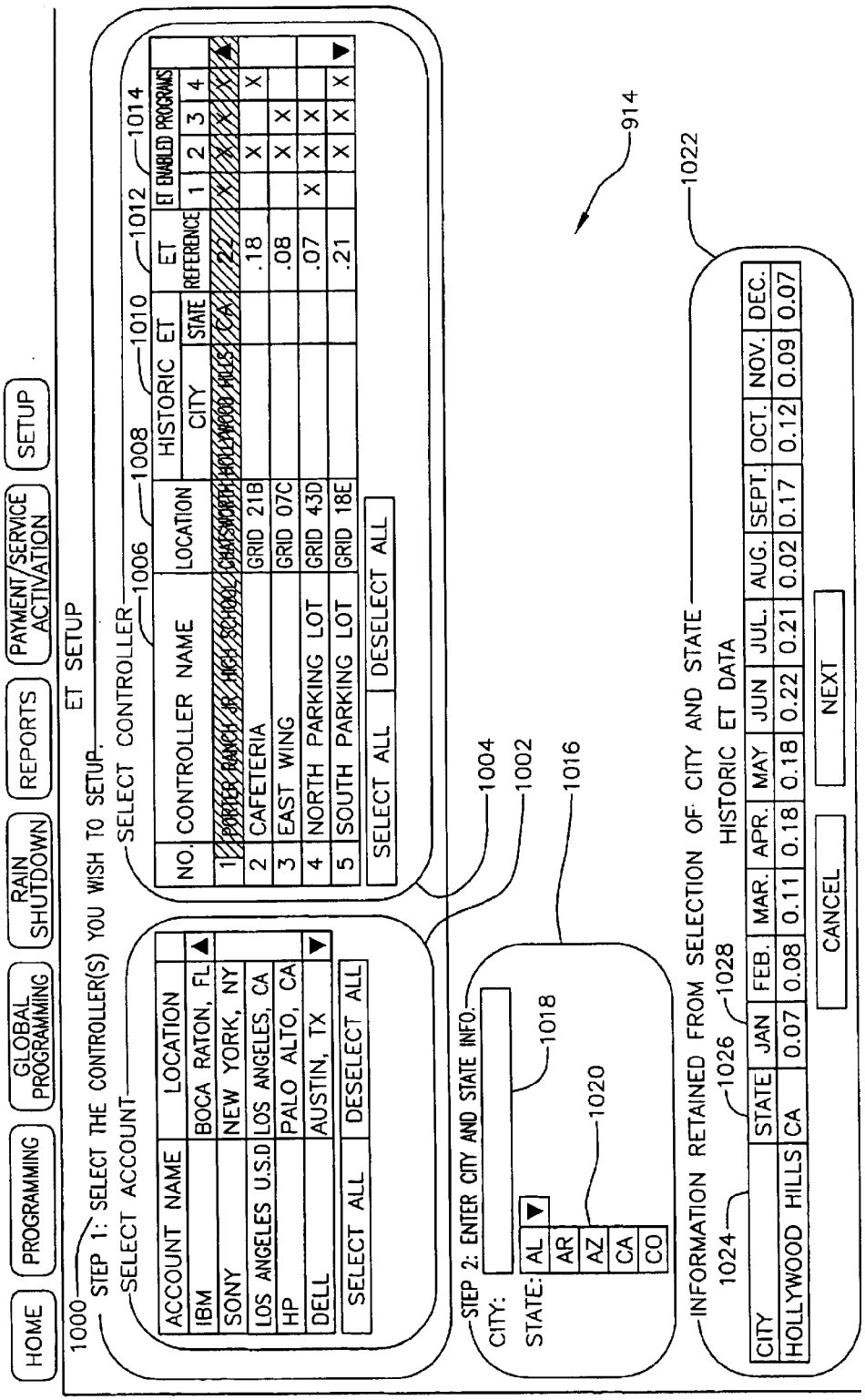
FIG. 10 is a user interface graphic of a portion of an evapotranspiration setup graphical user interface in accordance with an exemplary embodiment of the present invention.

FIG. 10 is a block diagram of an evapotranspiration setup graphical user interface in accordance with an exemplary embodiment of the present invention. The user is directed (1000) to select an irrigation controller for setup. The user selects an irrigation controller by selecting an account from an account menu 1002 and then selecting an irrigation controller from an irrigation controller menu 1004. The irrigation controller menu includes rows of fields for identification and selection of irrigation controllers. The fields include an irrigation controller name field 1006, a location field 1008, a selected historic evapotranspiration data field 1010 having a city location and a state location, a reference evapotranspiration reference field 1012 for display of a previously selected reference evapotranspiration data, and a selected evapotranspiration enabled field 1014 for display of which of the selected irrigation controller programs use evapotranspiration data to adjust runtimes. Once the user has selected an irrigation controller to setup, the user is presented with a historic evapotranspiration data selection menu 1016 having a city entry field 1018 and a state selection field 1020. The user uses the historic evapotranspiration data selection menu to associate an irrigation controller with a geographic location such as a city. Once associated, historic evapotranspiration data may then be transmitted to the irrigation controller for adjusting irrigation programs as previously described. After the user selects a geographic location to associate with an irrigation controller, the user may view the historic evapotranspiration data to be transmitted by the irrigation server to the irrigation controller in a historic evapotranspiration data table 1022. The data table includes city, state and time period (date) data.

Figure 11:
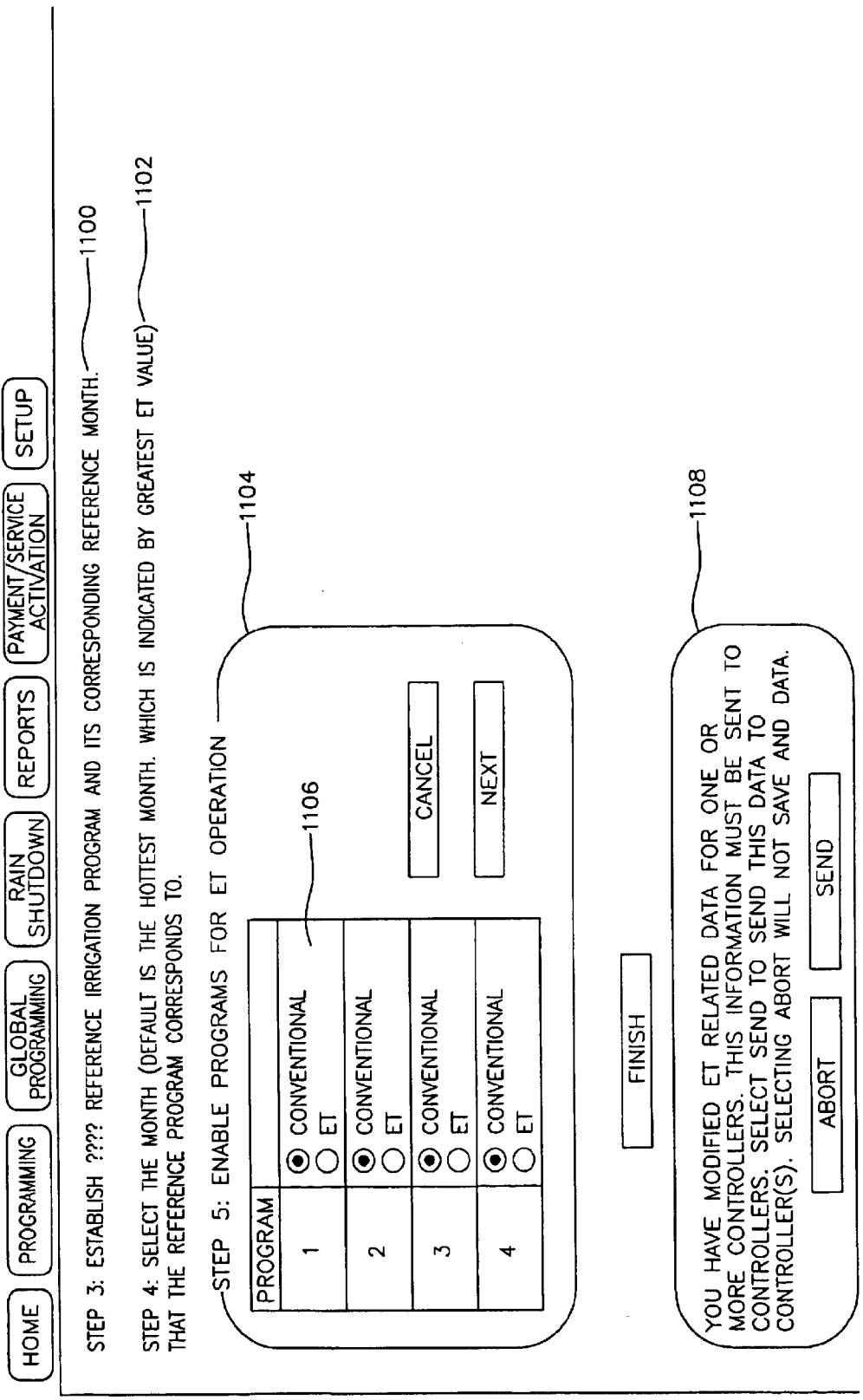
FIG. 11 is a user interface graphic of another portion of an evapotranspiration setup graphical user interface in accordance with an exemplary embodiment of the present invention.

FIG. 11 is a block diagram of another portion of an evapotranspiration setup graphical user interface in accordance with an exemplary embodiment of the present invention. To enable an irrigation controller to adjust runtimes using evapotranspiration data, a reference month and associated reference evapotranspiration data are established (1100) by the user. The user is prompted (1102) to enter a reference month, usually the month with the highest evapotranspiration rate, for transmission to, and use by, the irrigation controller. The user is also prompted (1104) to select which irrigation programs will use the evapotranspiration data to adjust runtimes. The user does so using by selecting a "Conventional" or "ET" radio button 1106 for each program. For a program with a "Conventional" setting, the irrigation controller does not adjust the program's runtimes using evapotranspiration data. For a program with an "ET" setting, the irrigation controller does adjust the program's runtimes using evapotranspiration data. After a user has finished setting up an irrigation controller for use of evapotranspiration data, the user is prompted (1108) to either transmit the new evapotranspiration setup data to the irrigation controller or to abort the transmission and the evapotranspiration setup process.

Referring again to FIG. 9, the user uses an account setup Web-page 916 to assign irrigation controllers to an account. FIG. 12 is a block diagram of an irrigation controller and programming setup graphical user interface in accordance with an exemplary embodiment of the present invention. A user is prompted (1200) to select an account from an account list 1201 having an account name column and an account location column. Once the user has selected an account, the user is prompted (1202) to select an irrigation controller from an irrigation controller list 1203 having an irrigation controller number column, an irrigation controller name column, and an irrigation controller location column. Once an irrigation controller has been selected, the user is prompted (1204) to either setup the irrigation controller's programs or set the irrigation controller's time and date 1205.

If the user chooses to setup the irrigation controller's programs, the user is presented with an irrigation controller program setup panel 1206. The irrigation controller program setup panel includes a radio button selector 1208 for setting whether or not a program uses a master valve to control flow to all of the irrigation stations.

The irrigation controller program setup panel includes a radio button selector 1210 for setting whether or not a program uses a pumping station to supply water to an irrigation controller's irrigation stations. The irrigation controller program setup panel also includes a radio button selector 1212 for setting whether or not a program is a "cycle and soak" program. A cycle and soak program specifies that an irrigation controller cycle an irrigation station through a series of on and off periods until the on-time equals a specified runtime for a station.

The irrigation controller program setup panel includes a radio button selector 1214 for setting whether or not programs must be "stacked". Stacking of programs prevents programs from running simultaneously. For example, if a first program specifies a first irrigation station should be activated and a second program specifies a second irrigation station should be activated during the same time period on the same irrigation controller, the water flow supplied to the irrigation stations may be too great causing both of the irrigation stations to be under pressured and thus not operate properly or underwater the landscaping. Stacking of programs prevents this from happening by preventing the programs from operating irrigation stations in parallel.

The irrigation controller program setup panel also includes a radio button selector 1216 for setting whether or not a program is sensitive to a control signal received from a rain sensor. In addition, the irrigation controller program setup panel includes a radio button selector 1218 for setting whether or not a program uses "skip day" skipping or conventional week programming. Skip day programming allows a user to specify a watering cycle such as "water every other day". Conventional week programming allows a user to specify a water cycle like "water every Monday, Wednesday, and Friday".

The irrigation controller program setup panel includes a radio button selector 1220 for setting whether or not a program uses evapotranspiration data to modify runtimes as previously described. The irrigation controller program setup panel also includes a radio button selector 1222 for setting whether or not a program will be prevented from watering on even and odd days. This setting is used when the irrigation controller is limited to operations on even or odd days in order to meet regulatory requirements.

The user may also set an irrigation controller's date and time of day using a time setting panel 1224 having selectable calendar, date, and time portions.

FIG. 13 is an irrigation controller setup graphical user interface in accordance with an exemplary embodiment of the present invention. A user uses the irrigation controller setup graphical user interface to set values for parameters that affect an irrigation controller's operations with respect to all of the irrigation controller's irrigation stations. The user interface includes a radio button selector 1302 for setting whether or not an irrigation controller is coupled to a flow sensor. If the irrigation controller is coupled to a flow sensor, the user may set the size of the pipe in which the flow sensor is installed using a pipe size menu 1304. If a flow sensor is installed, the user may set various flow limits for the sensor based on the expected operations of the irrigation stations coupled to the irrigation controller. Upon detecting flow rates in excess of the user set flow limits, the irrigation controller may issue an alarm and may also close a main flow valve. For example, the user may set a main line flow limit 1306 to limit the maximum amount of flow that can pass through the irrigation controller's main control valve. The user may also set an unscheduled flow limit 1308. An unscheduled flow is one in which the irrigation controller detects flow but no irrigation stations are scheduled to be activated. A flow check delay 1310 is a delay introduced after a change of irrigation stations during which the irrigation controller will not check for flow limits.

In one embodiment of an irrigation controller, the irrigation can learn the typical flow rates of individual irrigation stations and adapt flow limits based on the typical flow rates. An auto learn flow percentage 1312 is set by the user to tell the irrigation controller how much more flow than the typical flow for an irrigation station indicates a flow limit error. For example, if an irrigation stations typical flow rate is 30 GPM and the auto learn flow percentage value is set to 20%, the irrigation controller will indicate a flow limit fault if the flow rate of the irrigation station exceeds 36 GPM. A user may also manually set the upper flow limits of each irrigation station using a station and flow limit table 1314.

A user may also set the type of master valve used by the irrigation controller using a master valve type radio button selector 1316. A master valve may be either normally open or normally closed. The user may also set an inter station delay 1318 which is the amount of time the irrigation controller will wait between successive activations of irrigation stations while executing a program. A user may also enter a security code 1320. Once a security code is set, the security code must be used to access the irrigation controller for subsequent operations. A user may also enable an audio alarm using an audio alarm radio button selector 1322.

Figure 14:
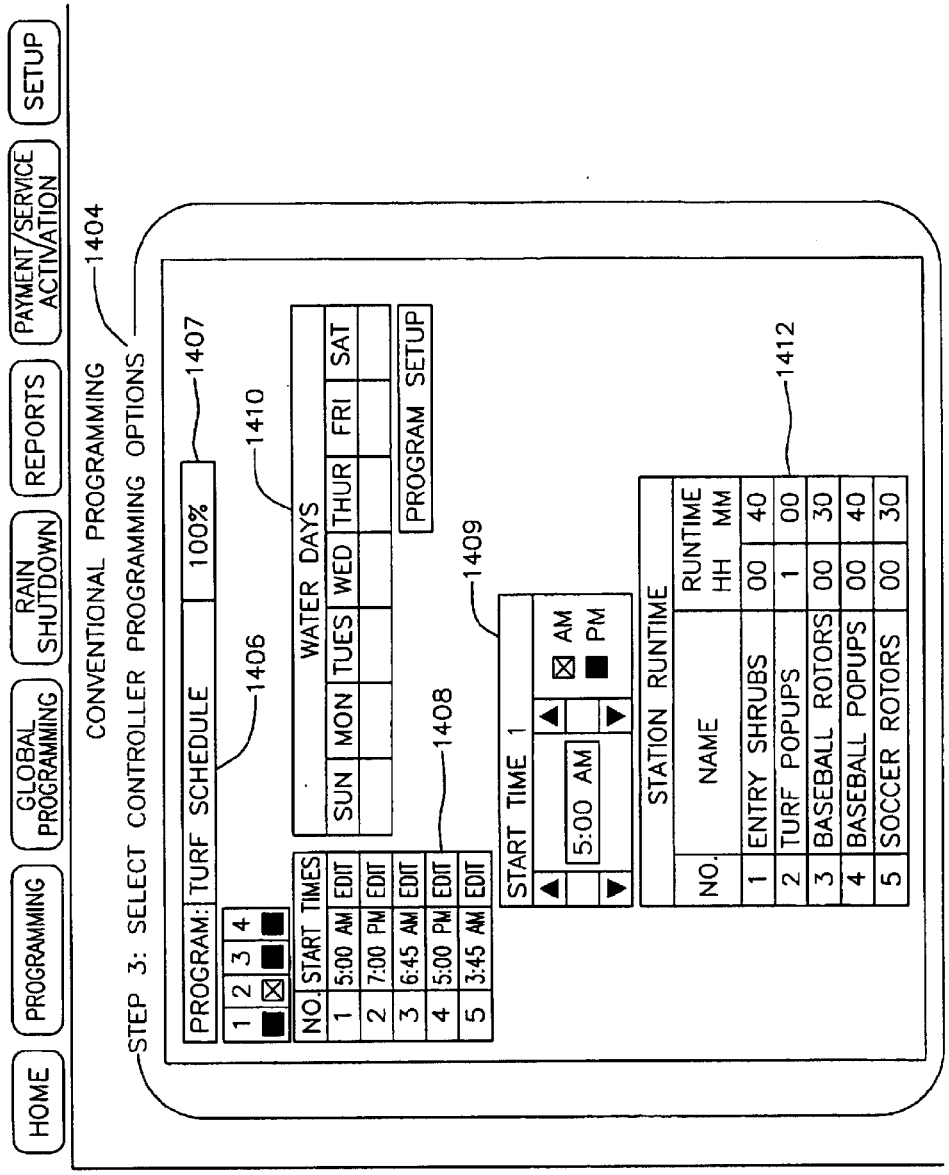
FIG. 14 is a conventional programming setup graphical user interface in accordance with an exemplary embodiment of the present invention.

FIG. 14 is a conventional programming setup graphical user interface in accordance with an exemplary embodiment of the present invention. A user is prompted (1404) to select irrigation controller programming options after selecting an account and an irrigation controller for setup. A user can select a program to modify using a program radio button selector 1406. Once a program is selected a user may enter a name to associate to the program, such as "Turf Schedule" 1407, and establish a program percent value. The percent value is used for water budgeting and allows all station runtimes within the program to be adjusted either higher or lower at the time that the station irrigates. The user may also set the days a program runs using a water days selector 1410. In addition, a user may enter start times for each irrigation program using a start time menu 1408 having a number column showing the start time number, a start time display column, and an edit selector. If a user selects the edit selector for an irrigation station, the user may enter a start time for the irrigation program using a start time entry panel 1409 having a time entry field and an AM or PM radio selector button. In addition, a user may set the runtime for an irrigation station using a runtime menu 1412 having an irrigation station column, an irrigation station name column, and a runtime column with hour and minute settings.

FIG. 15 is a block diagram of an evapotranspiration programming graphical user interface in accordance with an exemplary embodiment of the present invention. The evapotranspiration programming graphical user interface is similar to the previously described conventional programming setup graphical user interface except that the user does not enter a water budget value as a percentage adjustment 1502. Instead the web-site calculates and displays the percentage water savings that is being achieved based upon present evapotranspiration calculations. In addition, a station runtime menu 1504 includes an evapotranspiration adjusted run time portion including an evapotranspiration data adjusted runtime hours column 1514 and minutes column 1516.

FIG. 16 is a block diagram of a rain shut down graphical user interface in accordance with an exemplary embodiment of the present invention. A user may use the rain shut down graphical user interface to transmit a rain shutdown signal or an automatic watering resumption signal to an irrigation controller. A user selects an irrigation controller as previously described. The user may then either select a rain shut down selector button 1602 to transmit a rain shutdown signal to the selected irrigation controller. A user may select an automatic watering selector button 1604 to transmit an automatic watering resumption signal to the selected irrigation controller, thus canceling any previous rain shutdown signal transmitted to the irrigation controller.

Figure 17:
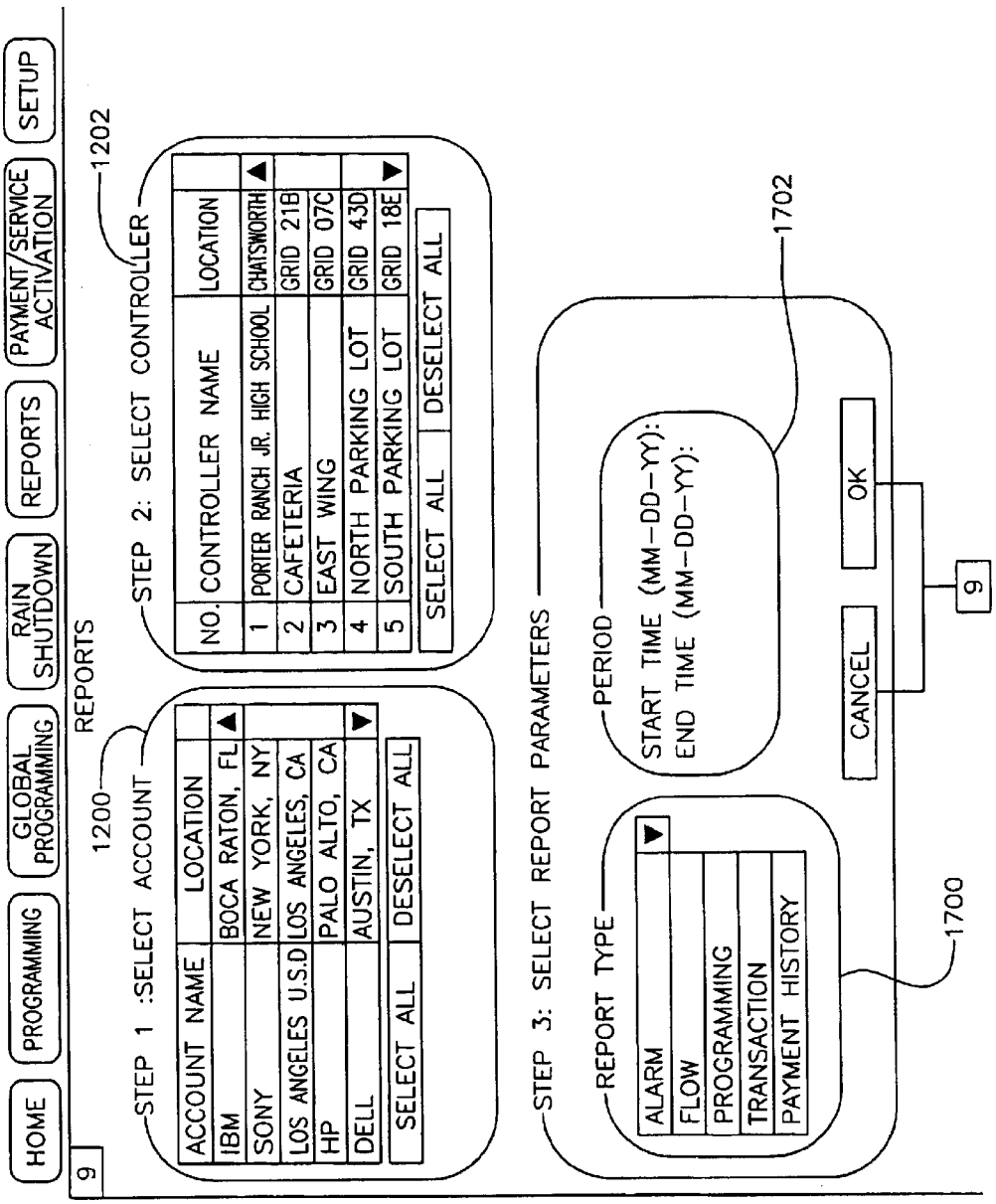
FIG. 17 is a user interface graphic of a report generator graphical user interface in accordance with an exemplary embodiment of the present invention.

FIG. 17 is a block diagram of a report generator graphical user interface in accordance with an exemplary embodiment of the present invention. A user selects an irrigation controller as previously described and a report type from a report type menu 1700. In response, a report 1702 is generated for the selected irrigation controller. For example, a report of alarm events may be generated showing the time and date an alarm was first raised and a date and time that the alarm was cleared. Other reports include: flow reports showing total flow through the irrigation controller or broken down by irrigation station; programming reports showing when the irrigation controller's programs were edited; transaction reports showing when a user last modified the user's account data; and a payment history showing an accounts payment history.

Figure 18:
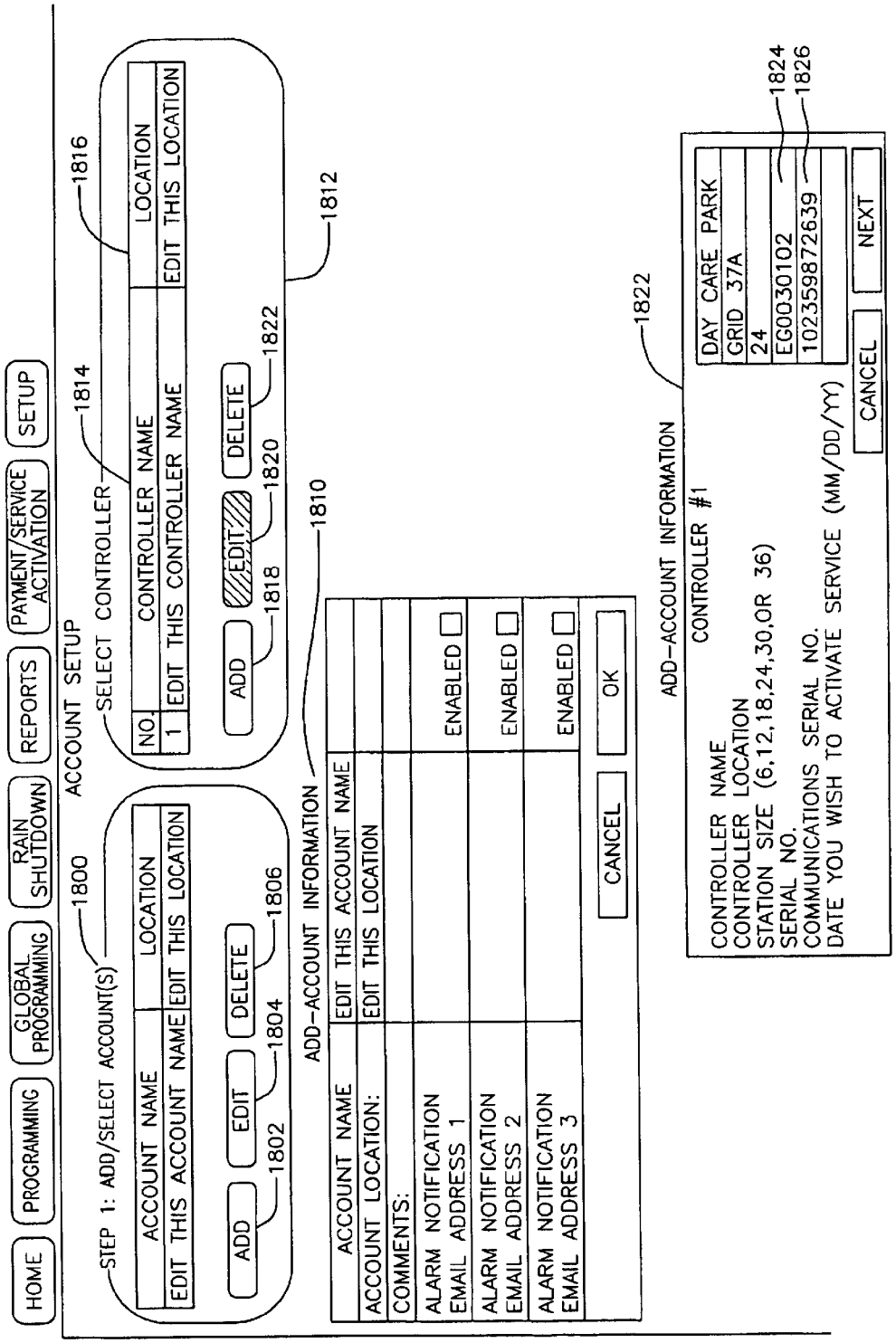
FIG. 18 is a user interface graphic of an account setup graphical user interface in accordance with an exemplary embodiment of the present invention.

FIG. 18 is a block diagram of an account setup graphical user interface in accordance with an exemplary embodiment of the present invention. A user uses the account setup graphical user interface to specify irrigation controllers associated with an account and to set parameters used by the user to manage the account. A user uses an account menu 1800 to add 1802, edit 1804, or delete 1806 an account. To add an account, the user selects the add account button and an account data panel 1810 is presented to the user. Using the account data panel, the user sets an account's name, an account's location, enters comments about the account, and enters one or more email addresses to which an irrigation controller's status messages may be sent. To edit an existing account, the user selects an account from the account menu and selects the edit button. The account data panel is presented to the user and the user uses the account data panel to modify the accounts setup data. To delete an account, a user selects an account from the account menu and then selects the delete account button and enters an account name and an account location.

Once an account is created, the user uses an irrigation controller selection menu 1812 having an irrigation controller name column 1814 and an irrigation controller location column 1816 to select irrigation controllers to associate with an account. A user adds an irrigation controller to the account by selecting an irrigation controller from the irrigation controller selection menu and selecting an add button 1818. To disassociate an irrigation controller from an account, the user selects an irrigation controller from the irrigation controller selection menu and selects a delete button 1822 to disassociate the irrigation controller form the account. To edit the account data for an irrigation controller, a user selects an irrigation controller using the irrigation controller selection menu and then selects an edit button 1820. The user is then presented with an irrigation controller data menu 1822. Using the irrigation controller menu 1823, a user can edit an irrigation controllers name, location, station size, and activation date. A user also uses the irrigation controller data menu to enter an irrigation controller's serial number 1824 and communications interface card serial number 1826.

In another web-site in accordance with an exemplary embodiment of the present invention, a user may use a client to access the web-site wherein the client is hosted by a device other than a personal computer. For example, the web-site may be accessed by a wireless device, such as a cellular phone, or a personal digital assistant (PDA) with Internet access. In this case, the device may not have all of the presentation capabilities of the personal computer. For example, even though the cellular phone or PDA may have access to the Internet, and thus the web-site coupled to the irrigation controller, the device may not have the same presentation and input services as a personal computer. For example, there may not be a graphics display on the device, or the device's graphics display may be of low resolution. In this case, the web-site may include web-pages that are customized for presentation by specific devices. In addition, the web-pages may be customized for input using the input services of the specified device. For example, the web-pages may be written in a document markup language such as Voice extensible Markup Language (VXML). VXML allows the user to interact with the web-site with a telephone device having an VXML browser capable of presenting audio prompts and receiving voice or keypad inputs. In this way, the user may access an irrigation controller using any Internet enabled device and operate the irrigation controller through the web-site or irrigation server as previously described.

Although this invention has been described in certain specific embodiments, many additional modifications and variations would be apparent to those skilled in the art. For example, any communications network may be used to establish a communication link between a user and an irrigation controller through the irrigation server. In addition, the web-site may be accessed by any device capable of accessing the Internet. Finally, the irrigation program modification data may be any type of data that is useful in adjusting the operations of the irrigation controller. It is therefore to be understood that this invention may be practiced otherwise than as specifically described. Thus, the present embodiments of the invention should be considered in all respects as illustrative and not restrictive, the scope of the invention to be determined by claims supported by this application and the claims' equivalents rather than the foregoing description.

What is claimed is:

1. A method of operating an irrigation controller having a stored irrigation program, comprising:
   coupling the irrigation controller to a server through a communications network;
   receiving irrigation program modification data by the irrigation controller from the server through the communications network;
   modifying the irrigation program by the irrigation controller using the irrigation program modification data;
   generating irrigation station control signals by the irrigation controller using the irrigation program;
   generating status data by the irrigation controller;
   transmitting the status data by the irrigation controller to the server through the communications network;
   generating an email message by the server using the status data; and
   transmitting the email message by the server to an email server through the communications network.

2. The method of claim 1, wherein:
   the irrigation program includes an irrigation station runtime;
   the irrigation program modification data includes weather data; and
   modifying the irrigation program by the irrigation controller includes recalculating the irrigation station runtime using the weather data.

3. The method of claim 2, wherein the weather data includes evapotranspiration data.

4. The method of claim 2, wherein the weather data includes rain sensor data.

5. The method of claim 2, wherein the weather data is received by the server from a second irrigation controller coupled to a weather station.

6. The method of claim 1, wherein:

the irrigation program includes an irrigation station runtime;

the irrigation program modification data includes a program percent value; and modifying the irrigation program by the irrigation controller includes recalculating the irrigation station runtime using the program percent value.

7. The method of claim 1, wherein:

the irrigation program modification data includes an irrigation program start time; and modifying the irrigation program by the irrigation controller includes using the irrigation program start time.

8. The method of claim 1, wherein:

the irrigation program modification data includes an irrigation program water day; and modifying the irrigation program by the irrigation controller includes using the irrigation program water day.

9. The method of claim 1, further comprising:

coupling the server to a client through the communications network; and receiving the irrigation program modification data by the server from the client through the communications network.

10. The method of claim 9, further comprising:

coupling the server to a database; and putting the irrigation program modification data in the database by the server.

11. The method of claim 1, further comprising:

receiving an immediate command by the irrigation controller from the server through the communications network; and executing the immediate command by the irrigation controller.

12. The method of claim 1, wherein the communications network includes a wireless carrier.

13. The method of claim 12, wherein the wireless carrier includes a two-way paging wireless network.

14. The method of claim 12, wherein the wireless carrier includes a cellular digital packet network.

15. The method of claim 12, wherein the wireless carrier includes a code division multiple access network.

16. The method of claim 12, wherein the wireless carrier includes a global system for mobile communications network.

17. The method of claim 12, wherein the wireless carrier includes a general packet radio service network.

18. An irrigation controller, comprising:

a processor; and a memory coupled to the processor, the memory having processor executable program instructions stored therein, the program instructions including:

receiving an irrigation program by the irrigation controller from a server through a communications network coupled to the irrigation controller;

receiving irrigation program modification data by the irrigation controller from the server through the communications network;

modifying the irrigation program by the irrigation controller using the irrigation program modification data;

generating irrigation station control signals by the irrigation controller using the irrigation program;

generating status data by the irrigation controller;

transmitting the status data by the irrigation controller to the server through the communications network;

generating an email message by the server using the status data, and transmitting the email message by the server to an email server through the communications network.

19. The irrigation controller of claim 18, wherein:

the irrigation program includes an irrigation station runtime;

the irrigation program modification data includes weather data; and the program instructions modifying the irrigation program by the irrigation controller include recalculating the irrigation station runtime using the weather data.

20. The irrigation controller of claim 19, wherein the weather data includes evapotranspiration data.

21. The irrigation controller of claim 19, wherein the weather data includes rain sensor data.

22. The irrigation controller of claim 19, wherein the weather data is received by the server from a second irrigation controller coupled to a weather station.

23. The irrigation controller of claim 18, wherein:

the irrigation program includes an irrigation station runtime;

the irrigation program modification data includes a program percent value; and the program instructions modifying the irrigation program by the irrigation controller include recalculating the irrigation station runtime using the program percent value.

24. The irrigation controller of claim 18, wherein:

the irrigation program modification data includes an irrigation program start time; and the program instructions modifying the irrigation program by the irrigation controller includes using the irrigation program start time.

25. The irrigation controller of claim 18, wherein:

the irrigation program modification data includes an irrigation program water day; and the program instructions modifying the irrigation program by the irrigation controller include using the irrigation program water day.

26. The irrigation controller of claim 18, wherein the communications network includes a wireless carrier.

27. The irrigation controller of claim 26, wherein the wireless carrier includes a two-way paging wireless network.

28. The irrigation controller of claim 26, wherein the wireless carrier includes a cellular digital packet network.

29. The irrigation controller of claim 26, wherein the wireless carrier includes a code division multiple access network.

30. The irrigation controller of claim 26, wherein the wireless carrier includes a global system for mobile communications network.

31. The irrigation controller of claim 26, wherein the wireless carrier includes a general packet radio service network.

* * * * *